(12) United States Patent
Gatten

(10) Patent No.: US 8,939,052 B2
(45) Date of Patent: Jan. 27, 2015

(54) PNEUMATICALLY POWERED POLE SAW

(76) Inventor: Ronald Alan Gatten, Pleasanton, CA (US)

( * ) Notice: Subject to any disclaimer, the term of this patent is extended or adjusted under 35 U.S.C. 154(b) by 359 days.

(21) Appl. No.: 13/448,340

(22) Filed: Apr. 16, 2012

(65) Prior Publication Data
US 2012/0240418 A1    Sep. 27, 2012

Related U.S. Application Data

(63) Continuation-in-part of application No. 12/265,795, filed on Nov. 6, 2008, now Pat. No. 8,156,655.

(60) Provisional application No. 60/986,865, filed on Nov. 9, 2007.

(51) Int. Cl.
B26D 5/12    (2006.01)

(52) U.S. Cl.
USPC ..................... 83/13; 83/588; 30/392

(58) Field of Classification Search
USPC .............. 83/13, 752, 747, 588; 30/392
See application file for complete search history.

(56) References Cited

U.S. PATENT DOCUMENTS

| | | | |
|---|---|---|---|
| 1,347,444 A * | 7/1920 | Christiansen | 91/279 |
| 1,556,061 A * | 10/1925 | Ball | 83/756 |
| 1,704,641 A | 3/1929 | Weed | |
| 2,097,692 A * | 11/1937 | Fiegel | 72/131 |
| 2,735,458 A | 2/1956 | Buchmann | |
| 3,149,537 A * | 9/1964 | Fink | 91/178 |
| 3,155,011 A | 11/1964 | Hyskell | |
| 3,241,459 A | 3/1966 | Pirrello | |
| 3,352,143 A * | 11/1967 | Bollar | 72/445 |
| 3,872,934 A | 3/1975 | Terada | |
| 4,429,752 A * | 2/1984 | Bailey et al. | 173/59 |
| 4,632,163 A | 12/1986 | Fandrich | |
| 4,662,551 A | 5/1987 | Dudley et al. | |
| 4,675,944 A | 6/1987 | Wells | |
| 4,691,439 A | 9/1987 | Marra | |
| 4,838,034 A | 6/1989 | Leonard et al. | |
| 4,977,674 A | 12/1990 | van der Merwe et al. | |
| 5,020,712 A | 6/1991 | Monacelli | |

(Continued)

FOREIGN PATENT DOCUMENTS

| CN | 201905066 U | 7/2011 |
|---|---|---|
| RU | 2046698 C1 | 10/1995 |

(Continued)

OTHER PUBLICATIONS

International Search Report dated Sep. 5, 2013 for International Application No. PCT/US2013/036564, International Filing Date Apr. 15, 2013.

(Continued)

Primary Examiner — Sean Michalski
(74) Attorney, Agent, or Firm — Cantor Colburn LLP

(57) ABSTRACT

A pneumatically powered pole saw is provided, the pole saw having gas actuated main valves configured for movement between first positions and second positions wherein the gas actuated main valves are located in a main valves assembly fluidly coupled to the piston chamber; and a first pilot valve is configured to send actuating gas through a conduit to the main valves assembly and a second pilot valve is configured to send actuating gas through a conduit to the main valves assembly wherein the cutting blade moves in opposite directions in response to the actuating gas of the first and second pilot valves.

20 Claims, 22 Drawing Sheets

(56) References Cited

U.S. PATENT DOCUMENTS

| | | | |
|---|---|---|---|
| 5,036,845 A | | 8/1991 | Scholley |
| 5,084,975 A | | 2/1992 | Melter |
| 5,086,848 A | * | 2/1992 | Hudak ............................. 173/1 |
| 5,127,399 A | | 7/1992 | Scholley |
| 5,134,776 A | | 8/1992 | Moody |
| 5,243,761 A | | 9/1993 | Sullivan et al. |
| 5,253,554 A | | 10/1993 | Riera et al. |
| 5,511,313 A | | 4/1996 | Yoder et al. |
| 6,065,216 A | | 5/2000 | Izumisawa |
| 6,065,373 A | | 5/2000 | Watanabe et al. |
| 6,149,356 A | | 11/2000 | Chu et al. |
| 6,268,077 B1 | | 7/2001 | Kelley et al. |
| 6,321,854 B1 | | 11/2001 | Bisutti |
| 6,357,439 B1 | | 3/2002 | Cook et al. |
| 6,415,876 B1 | | 7/2002 | Bollinger et al. |
| 6,488,050 B1 | | 12/2002 | Jabcon |
| 6,658,745 B1 | | 12/2003 | Huang |
| 6,932,128 B2 | | 8/2005 | Turan, Jr. |
| 7,051,995 B2 | * | 5/2006 | Tornqvist ...................... 251/211 |
| 7,207,116 B2 | | 4/2007 | Nakamura |
| 7,992,652 B2 | * | 8/2011 | Plunkett .......................... 173/13 |
| 8,640,787 B2 | * | 2/2014 | Rohrer .......................... 173/114 |
| 2002/0112356 A1 | | 8/2002 | Bollinger et al. |
| 2004/0117993 A1 | | 6/2004 | Armstrong |
| 2005/0109521 A1 | * | 5/2005 | Tornqvist ...................... 173/206 |
| 2007/0289760 A1 | * | 12/2007 | Sterling et al. ................ 173/104 |
| 2009/0107690 A1 | * | 4/2009 | Shibuya et al. ................. 173/14 |
| 2012/0240418 A1 | * | 9/2012 | Gatten ............................ 30/371 |

FOREIGN PATENT DOCUMENTS

| | | |
|---|---|---|
| SU | 185485 A1 | 10/1966 |
| SU | 501868 A1 | 3/1976 |

OTHER PUBLICATIONS

Written Opinion dated Sep. 5, 2013 for International Application No. PCT/US2013/036564, International Filing Date Apr. 15, 2013.

Print out from http://www.mytoolstore/astro.astmat02.html dated Oct. 8, 2007 (4 pages).

Print out from http://www.mytoolstore/fullstory/23359 dated Oct. 8, 2007 (3 pages).

International Search Report dated May 11, 2009 for International Application No. PCT/US2008/082551, International Filing Date Nov. 6, 2008.

Written Opinion dated May 11, 2009 for International Application No. PCT/US2008/082551, International Filing Date Nov. 6, 2008.

* cited by examiner

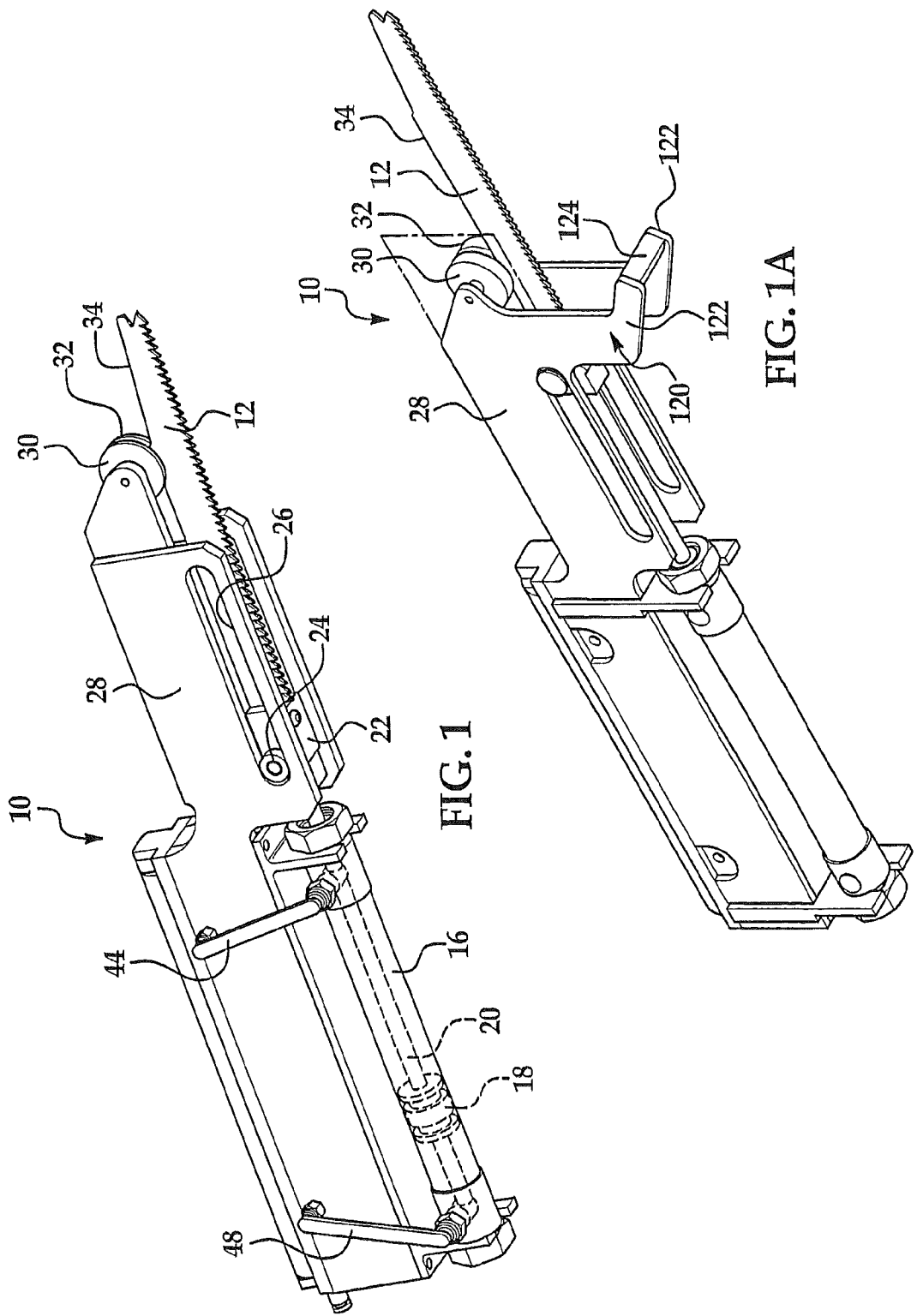

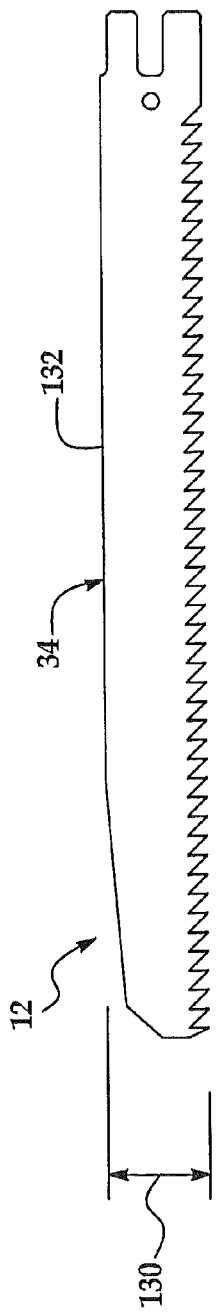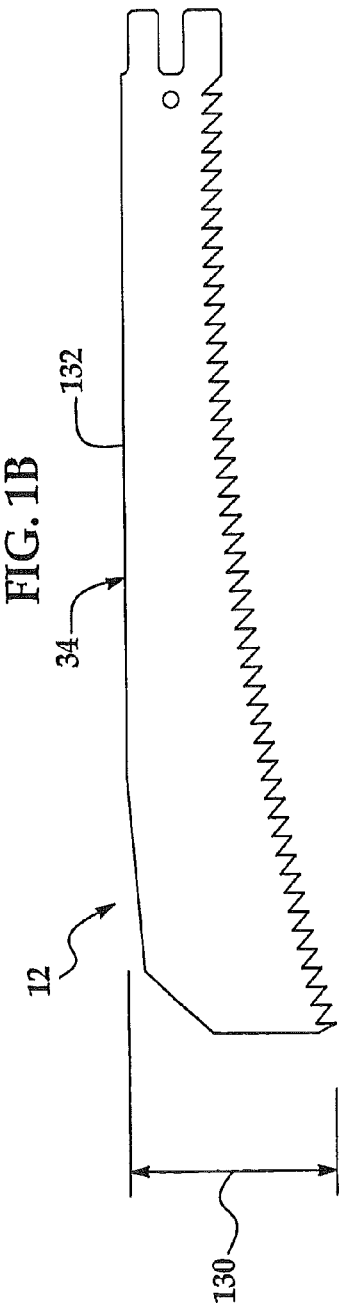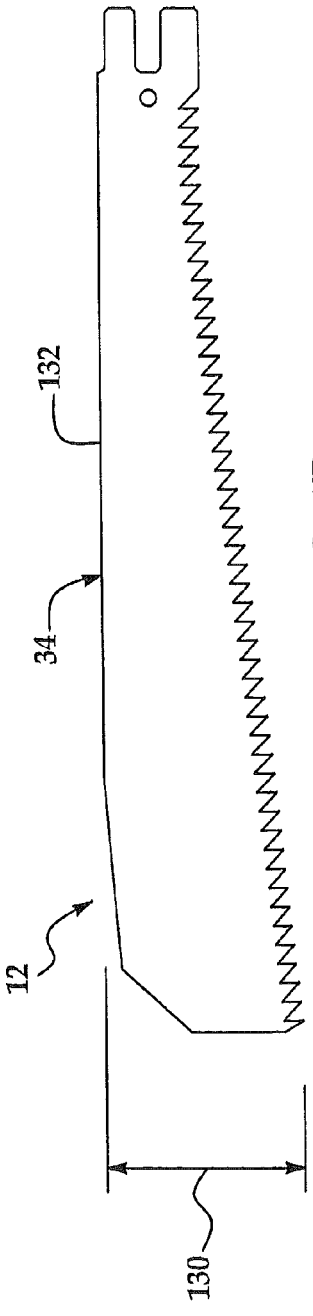

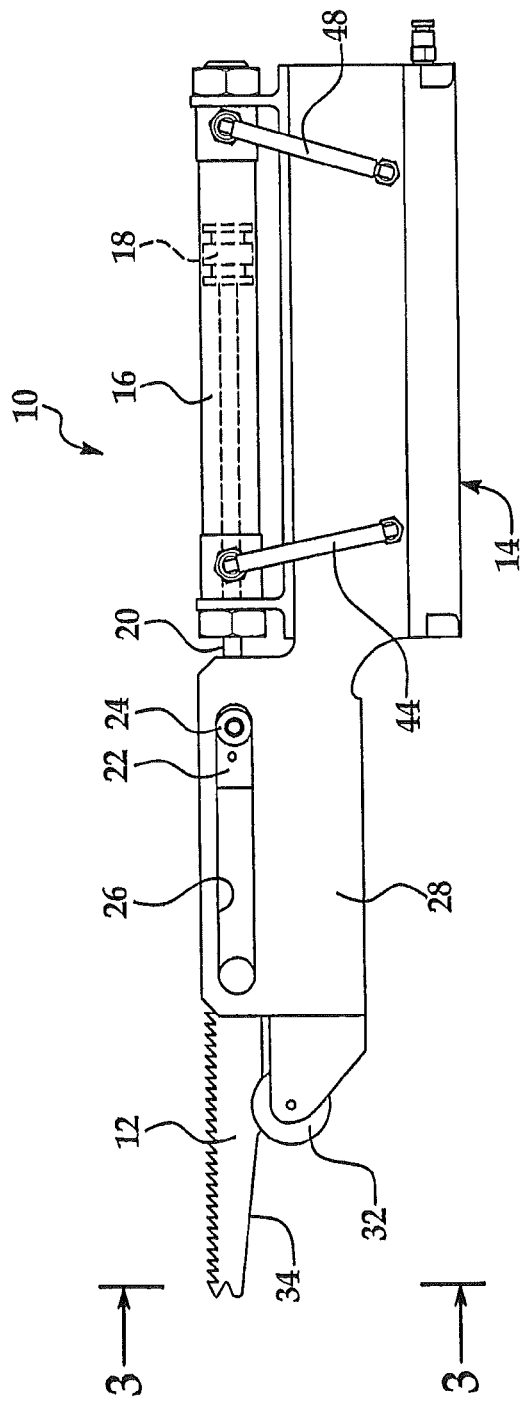
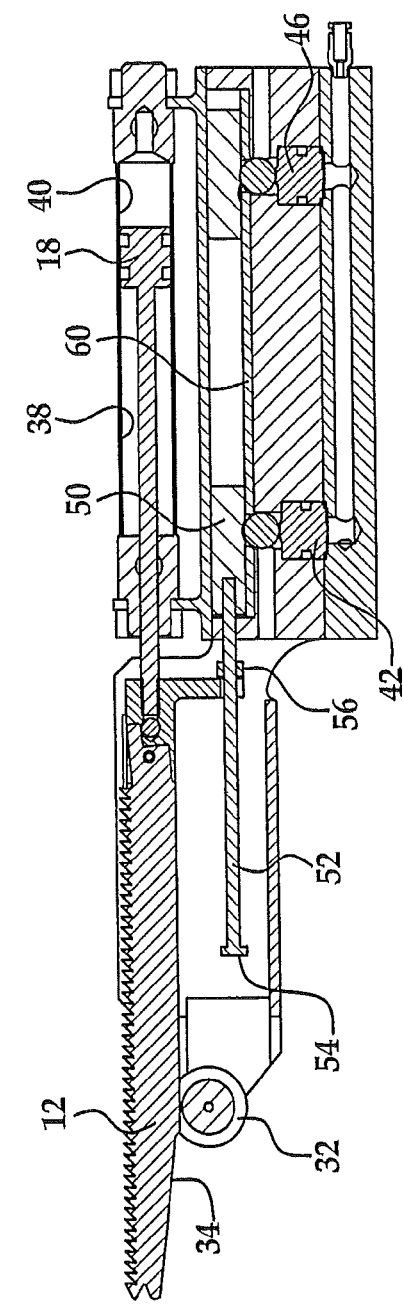
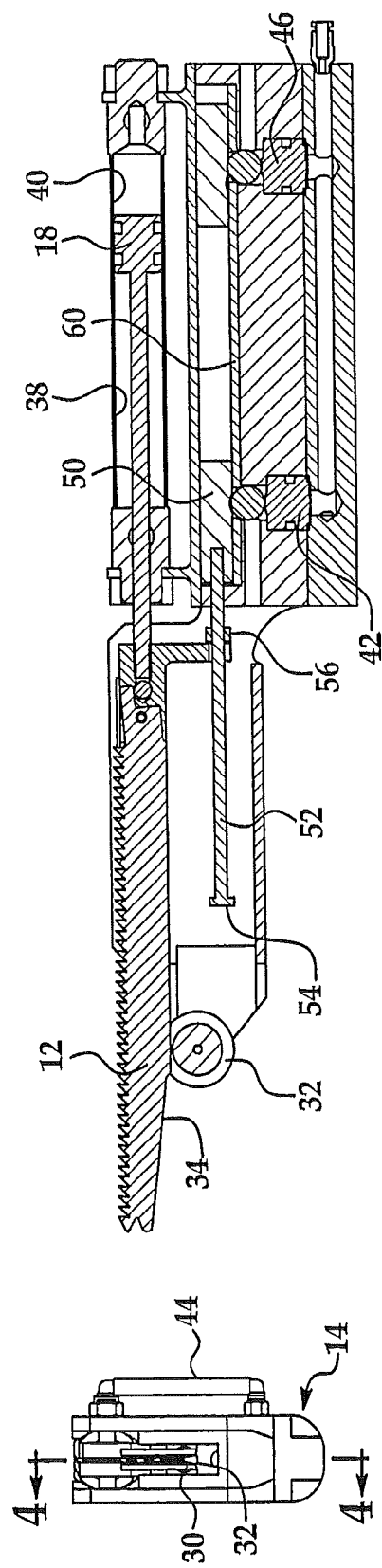

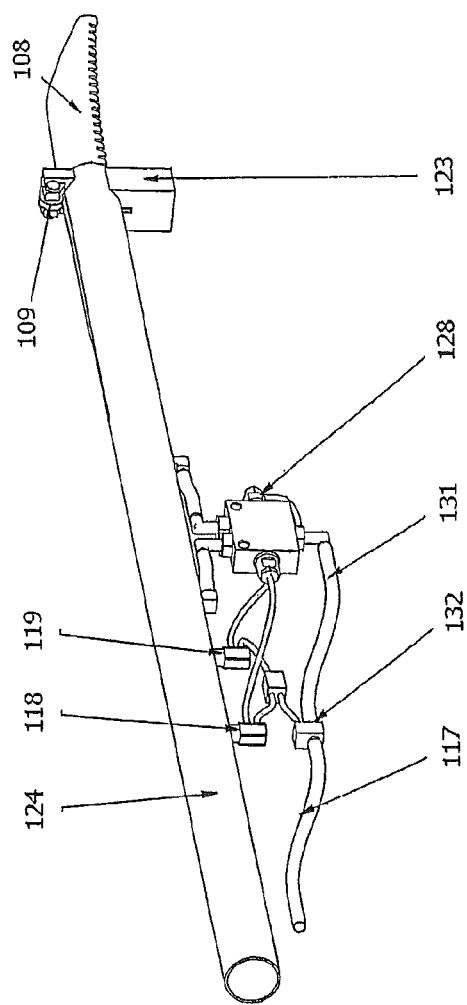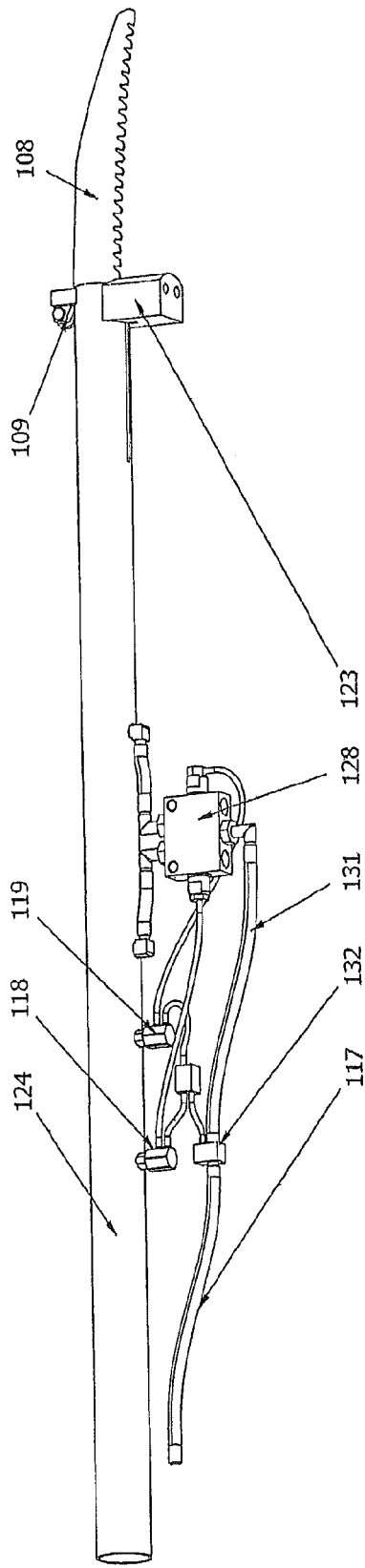
FIG. 12A
FIG. 12B

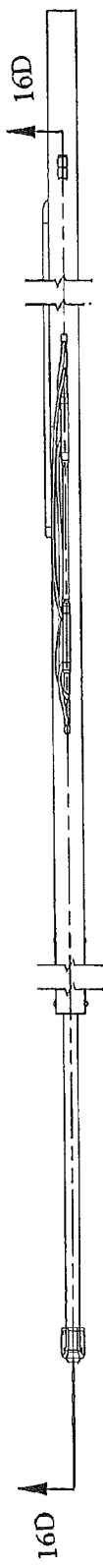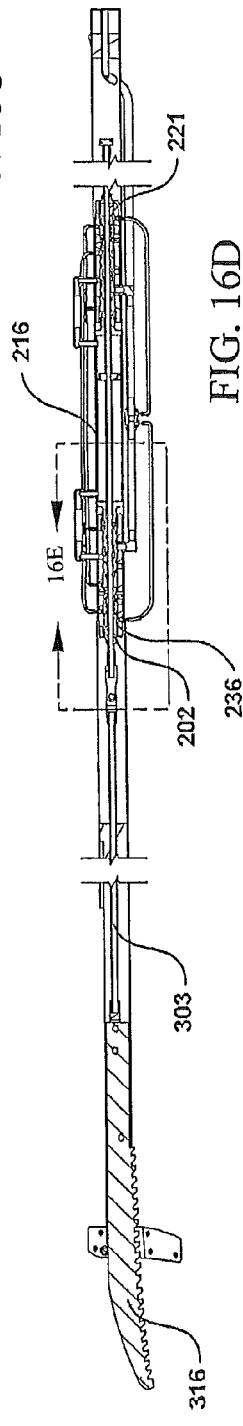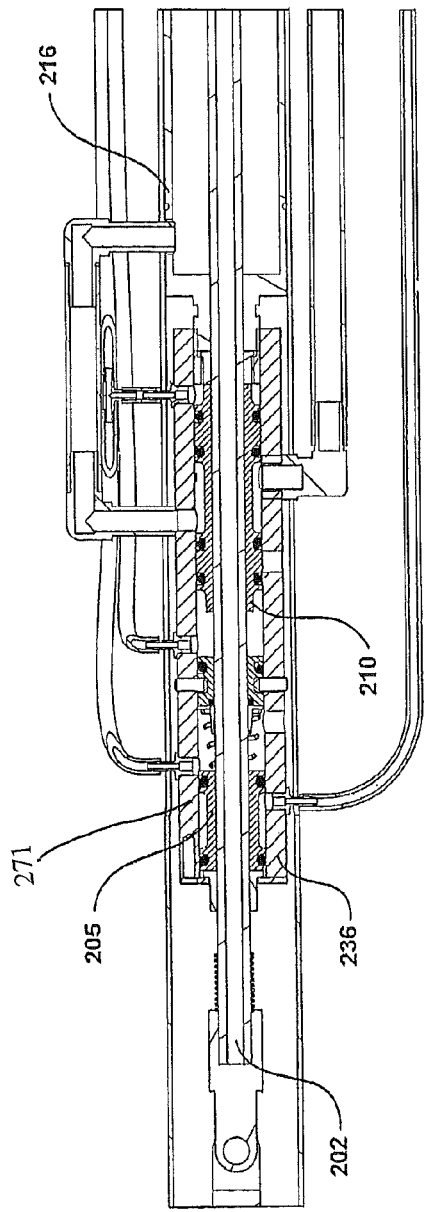
FIG. 16C
FIG. 16D
FIG. 16E

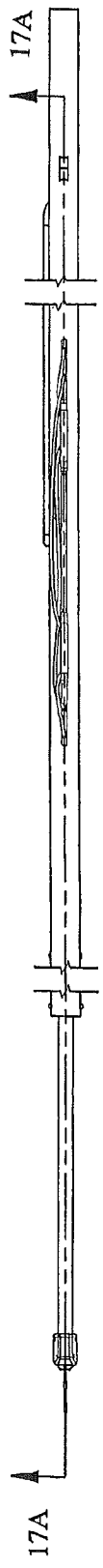
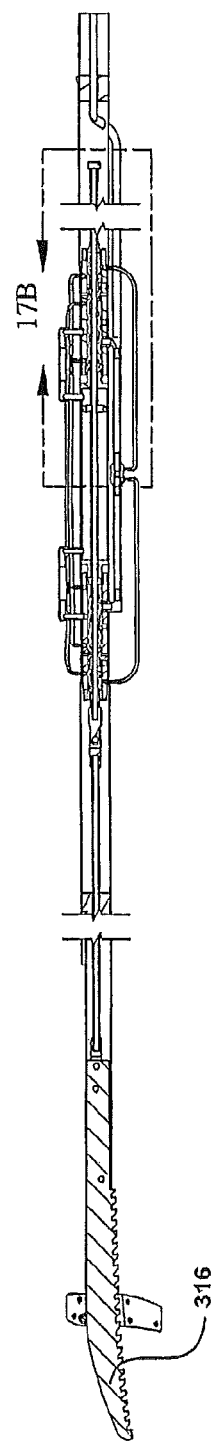
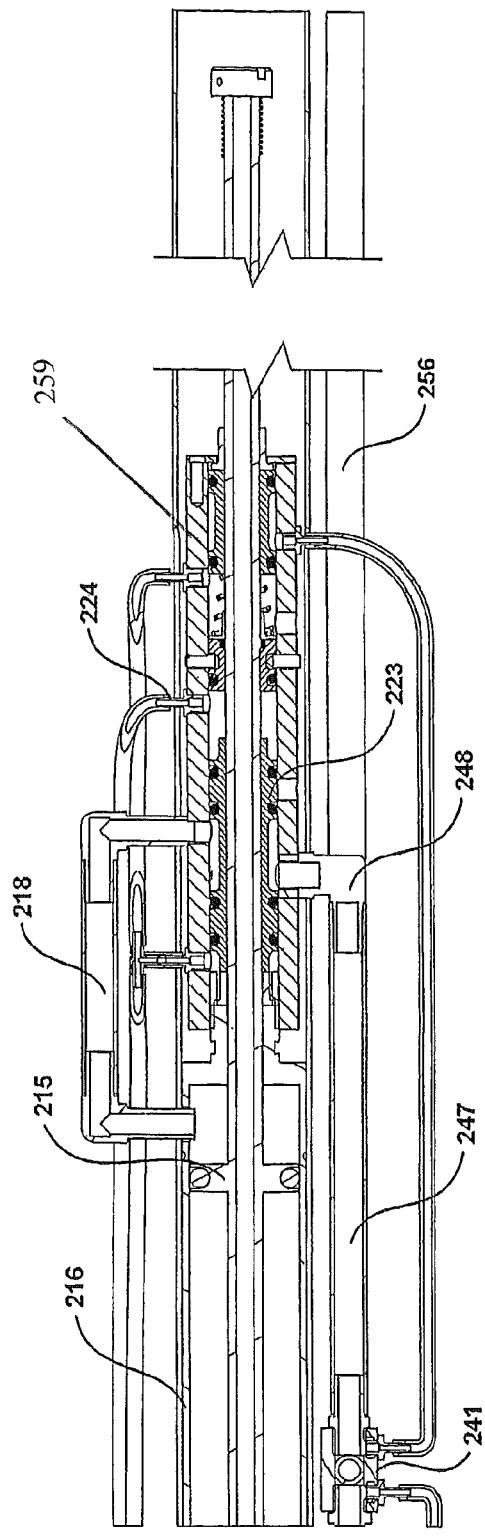
FIG. 17
FIG. 17A
FIG. 17B

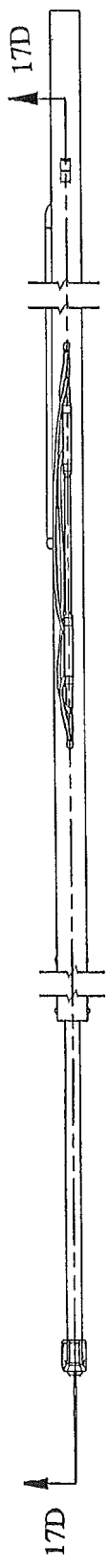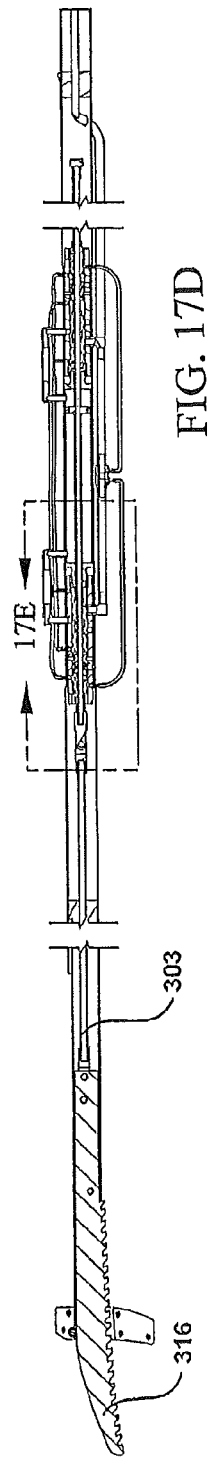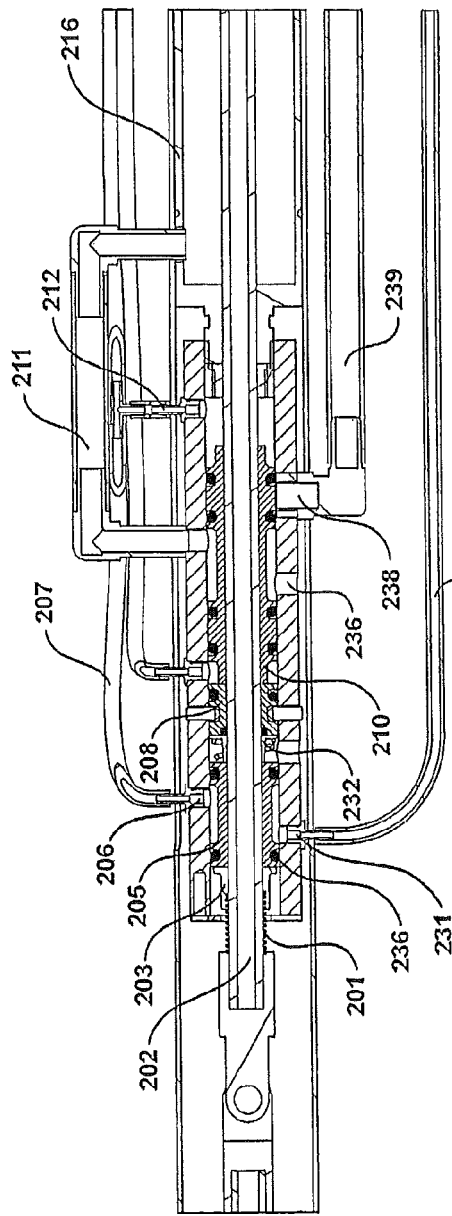

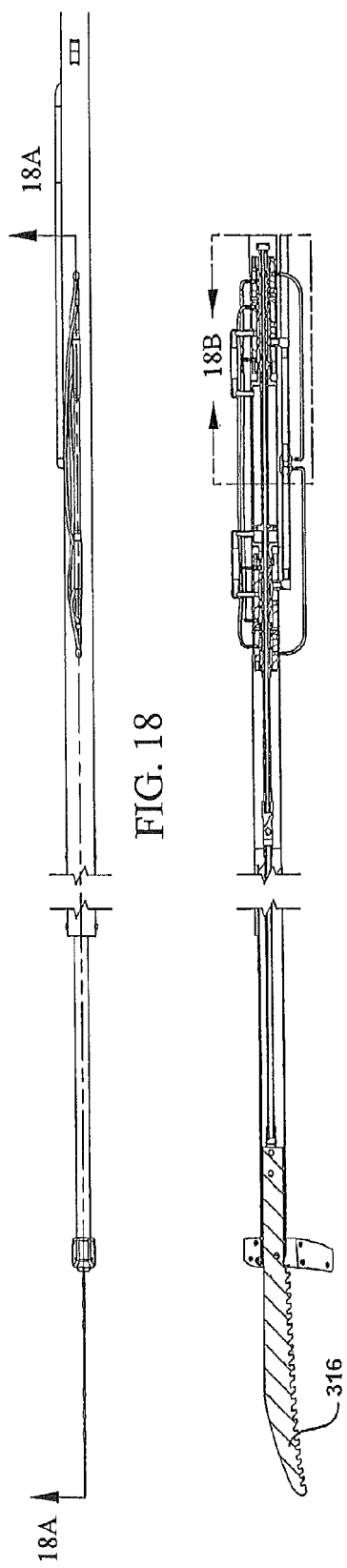
FIG. 18
FIG. 18A
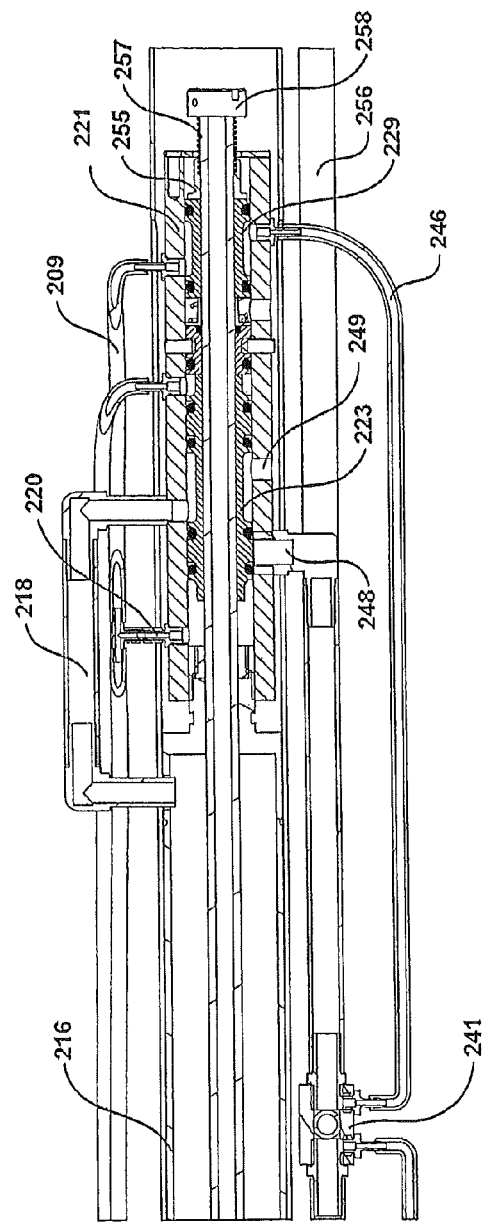
FIG. 18B

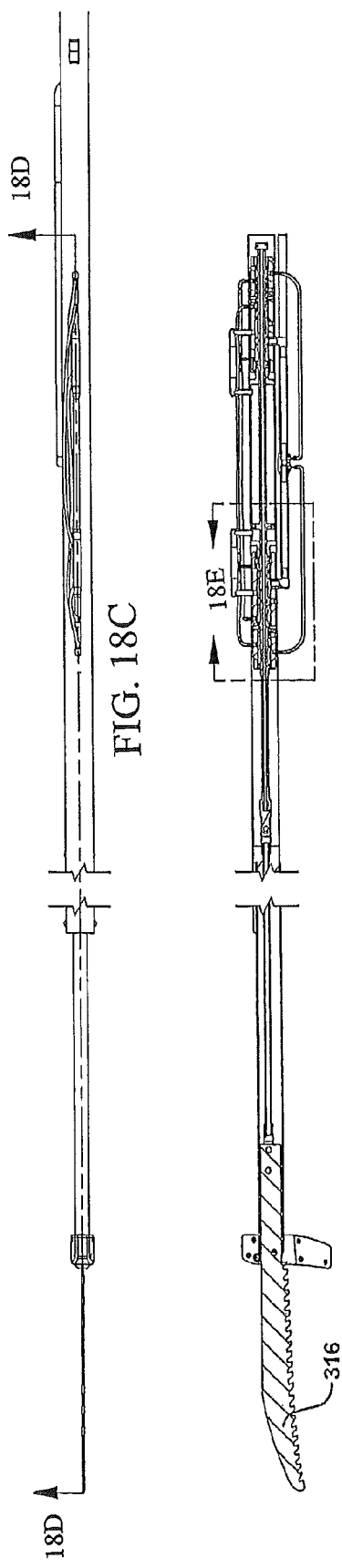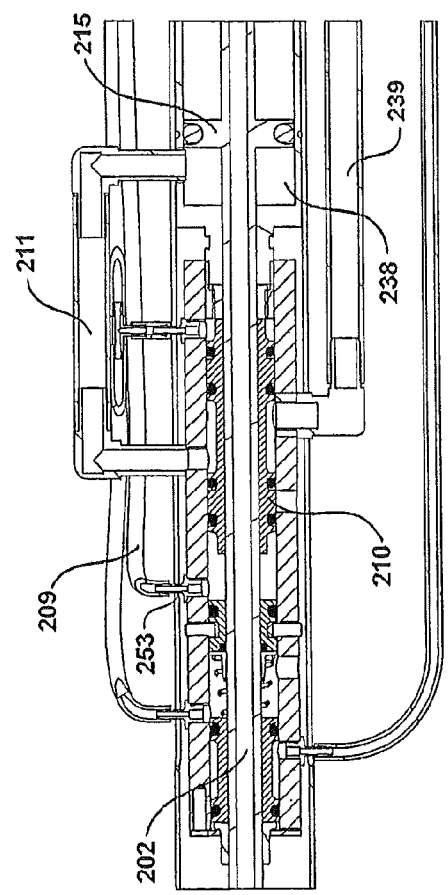
FIG. 18C
FIG. 18D
FIG. 18E

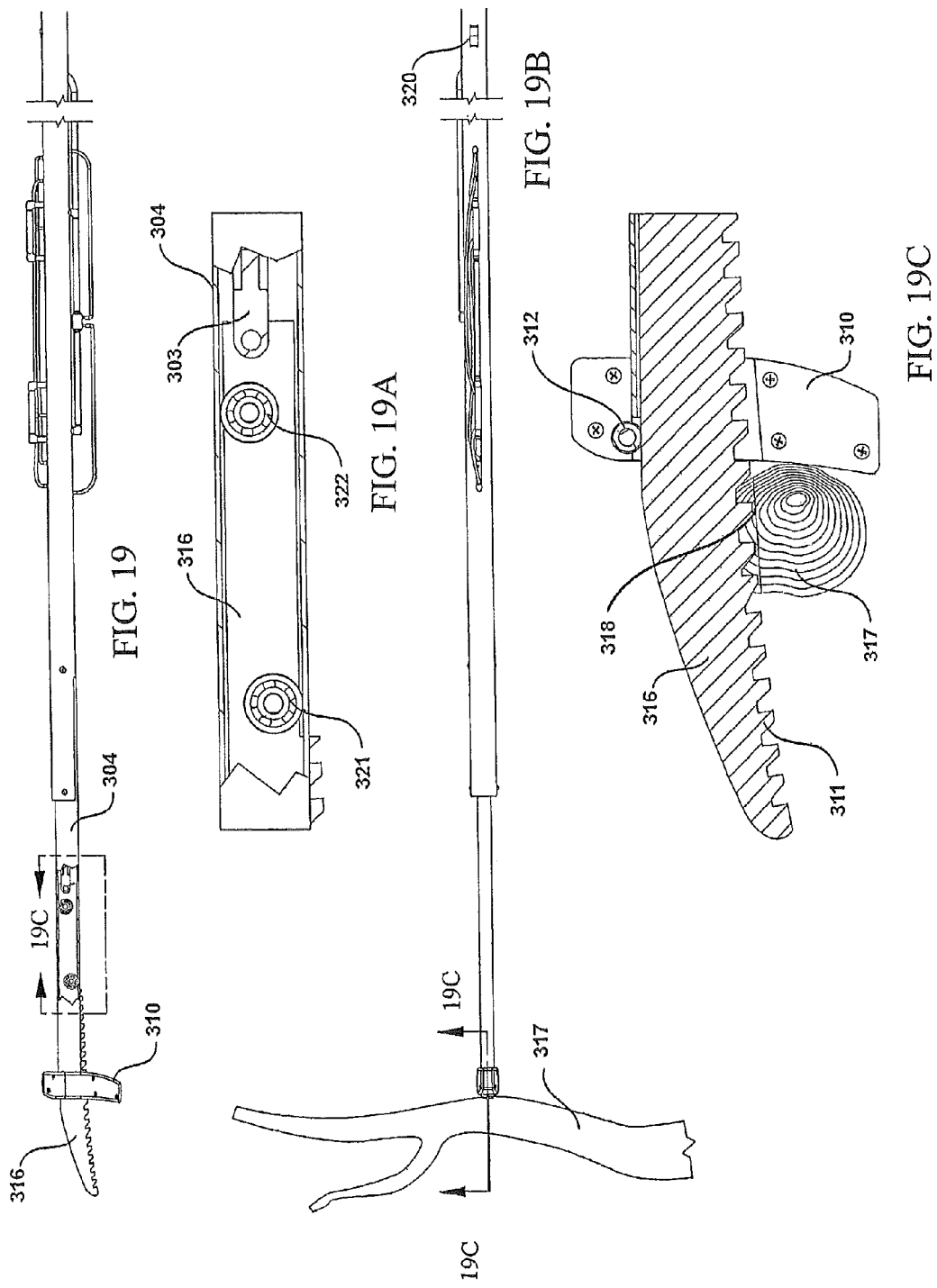

PNEUMATICALLY POWERED POLE SAW

CROSS REFERENCE TO RELATED APPLICATIONS

This application is a continuation in part of U.S. patent application Ser. No. 12/265,795 filed Nov. 6, 2008, which claims the benefit of U.S. Provisional Patent Application Ser. No. 60/986,865 filed Nov. 9, 2007, the contents each of which are incorporated herein by reference thereto.

BACKGROUND

Various embodiments of the present invention relate to a pneumatically powered pole saw.

Manually operated pole saws require an operator to manually push and pull a long pole back and forth in order to move a saw blade attached to the end of the pole, thereby cutting tree limbs with the attached saw blade. These pole saws rely entirely upon the operator force the necessary forces to be applied to the cutting blade or saw blade of the pole saw. Accordingly, and as the operator tires the efficiency of the cutting operation is reduced.

Accordingly, it is desirable to provide a powered pole saw having a means for efficiently converting stored energy into kinetic energy wherein the saw blade of the pole saw is actuated.

SUMMARY OF THE INVENTION

A pneumatically powered pole saw and method of operating is provided. Exemplary embodiments are directed to a pneumatically powered pole saw, comprising: an extendable pole; a head member secured to the extendable pole; a cutting blade movably mounted to the head member; a piston linked to the cutting blade, the piston being slidably received within a piston chamber of the head member; a reciprocating valve disposed in the head member, the reciprocating valve being configured for movement between a first position and a second position wherein the reciprocating valve releases a portion of a source of compressed gas into the piston chamber on one side of the piston when the reciprocating valve is in the first position causing the cutting blade to move in a first cutting direction towards a limit of travel in the first cutting direction and a first check valve provides fluid communication to the piston chamber on another side of the piston causing the reciprocating valve to move from the first position towards the second position, when the cutting blade reaches the limit of travel in the first direction, the reciprocating valve releases another portion of the source of compressed gas into the piston chamber on the another side of the piston when the reciprocating valve is in the second position causing the cutting blade to move in a second cutting direction opposite to the first cutting direction and towards a limit of travel in the second cutting direction and a second check valve provides fluid communication to the piston chamber on the one side of the piston, the reciprocating valve moving from the second position towards the first position when the cutting blade reaches a limit of travel in the second direction.

In another embodiment, a pneumatically powered pole saw is provided, the pole saw having: a pole; a cutting blade movably mounted to the pole; a piston slidably received within a piston chamber of the pole; a piston rod coupling to the cutting blade to the piston; gas actuated main valves configured for movement between first positions and second positions wherein the gas actuated main valves are located in a main valves assembly fluidly coupled to the piston chamber; a first pilot valve configured to send actuating gas through a conduit to the main valves assembly, the actuating gas of the first pilot valve actuating the gas actuated valves of the main valves assembly to the first position, wherein movement of the main valves to the first position releases a portion of a source of gas into the piston chamber on one side of the piston while venting the opposite side of the piston chamber, and when the main valves assembly is in the first position the cutting blade to moves in a first cutting direction towards a limit of travel in the first cutting direction; a second pilot valve configured to send actuating gas through a conduit to the main valves assembly when the limit of travel in the first cutting direction has been reached, the actuating gas of the second pilot valve causes the main valves to be moved to the second position, wherein movement of the main valves to the second position releases another portion of compressed gas into the piston chamber on the opposite side of the piston chamber and venting the one side of the piston chamber, wherein the cutting blade moves in an opposite second cutting direction with respect to the first cutting direction until a limit of travel in the second cutting direction is reached wherein the first pilot valve is again actuated and the cutting blade moves again in the first cutting direction until the limit of travel in the first cutting direction is reached.

In yet another embodiment, a pneumatically powered pole saw is provided, the pneumatically powered pole saw having: a pole; a cutting blade movably mounted to the pole; a piston slidably received within a piston chamber of the pole; a piston rod coupling to the cutting blade to the piston; gas actuated main valves configured for movement between first positions and second positions wherein the gas actuated main valves are located in a main valves assembly fluidly coupled to the piston chamber; a first pilot valve configured to send actuating gas through a conduit to the main valves assembly, the actuating gas of the first pilot valve actuating the gas actuated valves of the main valves assembly to the first position, wherein movement of the main valves to the first position releases a portion of a source of gas into the piston chamber on one side of the piston while venting the opposite side of the piston chamber, and when the main valves assembly is in the first position the cutting blade to moves in a first cutting direction towards a limit of travel in the first cutting direction; and a second pilot valve configured to send actuating gas through a conduit to the main valves assembly when the limit of travel in the first cutting direction has been reached, the actuating gas of the second pilot valve causes the main valves to be moved to the second position, wherein movement of the main valves to the second position releases another portion of compressed gas into the piston chamber on the opposite side of the piston chamber and venting the one side of the piston chamber, wherein the cutting blade moves in an opposite second cutting direction with respect to the first cutting direction until a limit of travel in the second cutting direction is reached wherein the first pilot valve is again actuated and the cutting blade moves again in the first cutting direction until the limit of travel in the first cutting direction is reached.

In another embodiment, a pneumatic valve assembly is provided, the pneumatic valve assembly having: a piston slidably received within a piston chamber a piston rod coupled to the piston; gas actuated main valves configured for movement between first positions and second positions wherein the gas actuated main valves are located in a main valves assembly fluidly coupled to the piston chamber; a first pilot valve configured to send actuating gas through a conduit to the main valves assembly, the actuating gas of the first pilot valve actuating the gas actuated valves of the main valves assembly to the first position, wherein movement of the main valves to the first position releases a portion of a source of gas into the piston chamber on one side of the piston while venting the opposite side of the piston chamber, and when the main valves assembly is in the first position the piston rod moves in a first direction towards a limit of travel in the first direction; a second pilot valve configured to send actuating gas through a conduit to the main valves assembly when the limit of travel in the first direction has been reached, the actuating gas of the second pilot valve causes the main valves to be moved to the second position, wherein movement of the main valves to the second position releases another portion of compressed gas into the piston chamber on the opposite side of the piston chamber and venting the one side of the piston chamber, wherein the piston rod moves in an opposite second direction with respect to the first direction until a limit of travel in the second direction is reached wherein the first pilot valve is again actuated and the piston rod moves again in the first direction until the limit of travel in the first direction is reached; and wherein the main valves assembly, the first pilot valve and the second pilot valve are each configured to slidably receive the piston rod therein.

In yet another embodiment, a method for pneumatically powering a pole saw is provided, the method including the steps of: slidably mounting a piston in a piston chamber for movement between a first position and a second position; and moving a reciprocating valve fluidly coupled to the piston chamber, wherein the reciprocating valve is configured for movement between a first position and a second position wherein the reciprocating valve releases a portion of a source of compressed gas into the piston chamber on one side of the piston when the reciprocating valve is in the first position causing the piston to move in a first direction towards a limit of travel in the first direction and a first check valve provides fluid communication to the piston chamber on another side of the piston causing the reciprocating valve to move from the first position towards the second position, when the piston reaches the limit of travel in the first direction, the reciprocating valve releases another portion of the source of compressed gas into the piston chamber on the another side of the piston when the reciprocating valve is in the second position causing the piston to move in a second direction opposite to the first cutting direction and towards a limit of travel in the second direction and a second check valve provides fluid communication to the piston chamber on the one side of the piston, the reciprocating valve moving from the second position towards the first position when the piston reaches a limit of travel in the second direction, wherein movement of the piston between the limits of travel in the first and second directions causes the reciprocating valve to move between the first position and the second position.

In still another embodiment, a compressed gas switching pneumatic valve assembly is provided, the valve assembly having: an outer pneumatic chamber; and a slidably received gas sealed valve member within the outer pneumatic chamber, wherein an internal void extends from one side of the outer pneumatic chamber to another side of the outer pneumatic chamber, the internal void being configured to allow axial location of an pneumatic valve assembly around an axially located piston rod of a pneumatic piston chamber, the pneumatic valve assembly further comprising at least fluid paths to provide switchable fluid flow into and out of the outer pneumatic chamber when the slidably received valve member is externally actuated to change a position within the outer pneumatic chamber.

The above-described and other features are appreciated and understood by those skilled in the art from the following detailed description, drawings, and appended claims.

DESCRIPTION OF THE DRAWINGS

FIG. 1 is a perspective view of a pneumatically powered pole saw constructed in accordance with an exemplary embodiment of the present invention;

FIG. 1A is a perspective view of a pneumatically powered pole saw constructed in accordance with an alternative exemplary embodiment of the present invention;

FIGS. 1B-D illustrate saw blades for use in various exemplary embodiments of the present invention;

FIG. 2 is a side view of a pneumatically powered pole saw constructed in accordance with an exemplary embodiment of the present invention;

FIG. 3 is a view along lines 3-3 of FIG. 2;

FIG. 4 is a cross-sectional view along lines 4-4 of FIG. 3;

FIGS. 12A-19C illustrate various view of alternative exemplary embodiments of the present invention.

DETAILED DESCRIPTION OF EXEMPLARY EMBODIMENTS

Figure 5A:
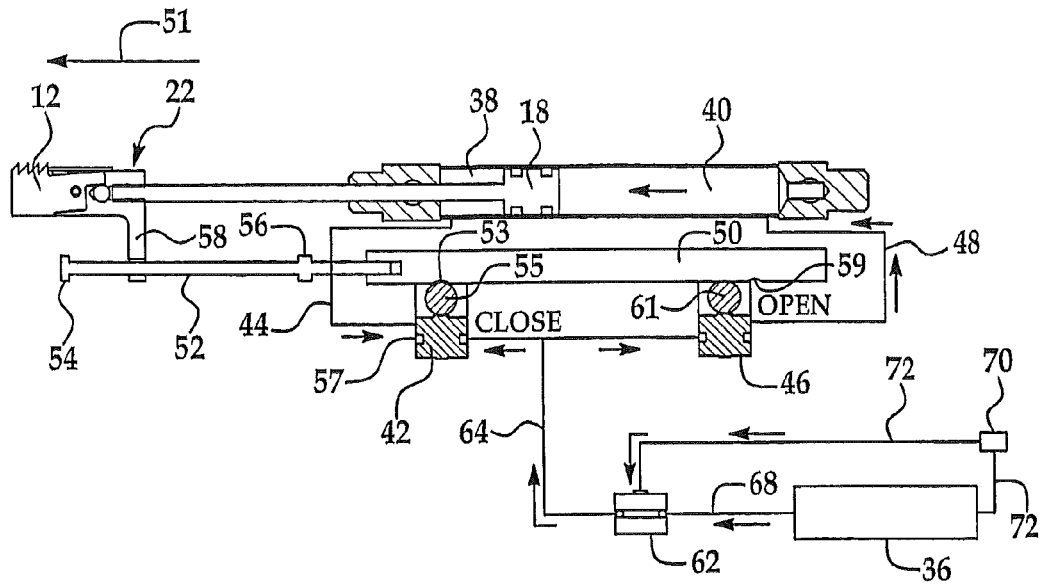
FIGS. 5A-5D are schematic illustrations of exemplary embodiments of the present invention.

In accordance with exemplary embodiments of the present invention, a pneumatically powered pole saw and method for operating the pole saw is disclosed. In an exemplary embodiment the pneumatically powered pole saw will comprise a source of compressed gas for use in driving the blade of the pole saw.

Referring now to FIGS. 1-5, a pneumatically powered pole saw 10 constructed in accordance with an exemplary embodiment of the present invention is illustrated. Pneumatically powered pole saw 10 has a cutting blade 12 movably mounted to a head member 14 of the pneumatically powered pole saw. Head member 14 further comprises a cylinder 16 configured to slidably receive a piston 18 therein. In accordance with an exemplary embodiment of the present invention piston 18 has at least one O-ring or sealing member that allows the piston to slide within the cylinder while also preventing or limiting fluid communication therethrough (e.g., maintaining or preventing fluids or gases on one side of the piston from passing around the piston to another side of the piston). Piston 18 is secured to a rod 20 that is secured to cutting blade 12 via a mount 22. Rod 20 passes through a sealed end of the housing wherein the rod is allowed to slide in and out without the release of the gases in the chamber through the opening the rod slides in. Mount 22 is configured to removably secure the cutting blade to the mount thus allowing removal and replacement of the cutting blade as it becomes worn, damaged or dulled. In one exemplary embodiment, the mount 22 has a pair of rollers 24 slidably received within a pair of complimentary channels or slots 26 disposed in a frame portion 28 of the head member. Rollers 24 allow the mount and the cutting blade to slide within a range of movement on the head member.

In one non-limiting exemplary embodiment, the head member further comprises a roller 30 rotatably mounted to the frame portion of the head member, the roller having a groove 32 configured to receive a non-toothed portion 34 of the cutting blade within the groove of the roller. Accordingly, roller 30 provides a means for supporting the cutting blade as it reciprocates within a range of motion on the head member.

In order to cause the cutting blade to traverse back and forth between a first position (e.g., cutting blade fully extended away from a distal end of the head member) and a second position (e.g., cutting blade fully retracted into the distal end of the head member) a source of compressed gas 36 is in selective fluid communication with a chamber (38, 40) at either side of the piston to cause movement of the piston in the chamber, wherein movement of the piston causes movement of the cutting blade by moving the rod and the mount. It being understood that size of chambers 38 and 40 vary accordingly with the movement of the piston 18. In one non-limiting exemplary embodiment, the source of compressed gas is self-contained reservoir of carbon dioxide. Of course, other suitable types of compressed gas are considered to be within the scope of exemplary embodiments of the present invention. In another exemplary embodiment, the source of compressed gas is provided by a reservoir fluidly coupled to a compressor 29, which may be a stand alone device or a wearable unit.

In order to provide fluid communication between the source of compressed gas and chamber 38 a first valve 42 is provided to allow selective fluid communication between the source of compress gas and chamber 38 via a conduit 44. First valve 42 is configured to allow fluid communication between the source of compressed gas and chamber 38 when the first valve is in an open position. Alternatively, and when the first valve is in a closed position chamber 38 is in fluid communication with atmosphere so that the gas in chamber 38 may be released to allow the cutting blade to travel to the first position. This is also provided by first valve 42 and conduit 44. Accordingly, and when the first valve is closed, chamber 38 via conduit 44 and first valve 42 allow the fluid in chamber 38 to be released into the atmosphere.

In order to provide fluid communication between the source of compressed gas and chamber 40 a second valve 46 is provided to allow selective fluid communication between the source of compress gas and chamber 40 via a conduit 48. Second valve 46 is configured to allow fluid communication between the source of compressed gas and chamber 40 when the second valve is in an open position. Alternatively, and when the second valve is in a closed position chamber 40 is in fluid communication with atmosphere so that the gas in chamber 40 may be released to allow the cutting blade to travel to the second position. This is also provided by second valve 46 and conduit 48. Accordingly, and when the second valve is closed, chamber 40 via conduit 48 and second valve 46 allow the fluid in chamber 40 to be released into the atmosphere.

In accordance with an exemplary embodiment of the present invention and in order to move the cutting blade to the first position the first valve is closed (e.g., gas vented from chamber 38) and the second valve is open (e.g., gas supplied from source to chamber 40). Similarly and in order to move the cutting blade to the second position the first valve is open (e.g., gas supplied from source to chamber 38) and the second valve is closed (e.g., gas vented from chamber 40).

In order to provide the opening and closing of valves 42 and 46 a slider 50 is movably received within head member 14 wherein movement of the slider causes the first valve and the second valve to open and close. In order to effect the movement of slider 50 a rod portion 52 of the slider has a pair of stops 54 and 56 wherein a portion 58 of the mount 22 is slidably received upon the rod portion 52. As the cutting blade traverses towards the first position the portion 58 will contact stop 54 and cause first valve 42 to open and second valve 46 to close thus, the cutting blade will then traverse towards the second position wherein the portion 58 will contact stop 56 and cause first valve 42 to close and second valve 46 to open thus, the cutting blade will then traverse towards the first position. This reciprocal movement of the cutting blade will continue until the source of gas is no longer fluidly coupled to the first valve and the second valve.

As illustrated in FIG. 4, the slider is slidably mounted above a cover plate 60 that is configured to allow slider 50 to open and close the first and second valves. Moreover, cover plate 60 is configured to prevent excessive wear from being caused by the reciprocal movement of the slider. In an alternative exemplary embodiment, the pneumatically powered pole saw is constructed without a cover plate (See FIGS. 5A-5D).

In order to provide fluid communication between the source of inlet or compressed gas 36 and the first valve and the second valve a control valve 62 is configured to provide fluid communication between the source of inlet or compressed gas 36 and the first valve and the second valve via conduits 64 between valve 42 and valve 46 and a conduit 68 between source of compressed gas 36 and control valve 62. In accordance with an exemplary embodiment of the present invention control valve 62 is in or proximate to head member 14 while conduit 68 extends to the source of compressed gas, which is disposed at an opposite end of a pole the head member is secured to.

Referring now to FIGS. 5A-5D operation of an exemplary embodiment of the present invention is illustrated. FIG. 5A illustrates the saw blade traveling in the direction of arrow 51. During this mode of operation and in the illustrated configuration of FIG. 5A valve 46 is open and compressed gas is being released into chamber 40 while the gas of chamber 38 is being released into the atmosphere from a vent of valve 42 thus piston 18 and the saw blade travel in the direction of arrow 51. It being understood that in order to effect movement in the direction of arrow 51 valve 42 is closed to conduit 64 while valve 46 is open to conduit 64 since a first feature 53 of the slider is positioned to receive a spring biased member 55 of valve 42 thus, causing conduit 64 to be closed to chamber 38 while chamber 38 is open to atmosphere via a vent 57 of valve 42.

In accordance with an exemplary embodiment of the present invention member 55 is biased generally into the direction of slider 50 such that when member 55 is received into feature 53 of slider 50 conduit 64 is closed to chamber 38 and vent 57 is open releasing the gas of chamber 38 while the saw blade travels in the direction of arrow 51.

Figure 5B:
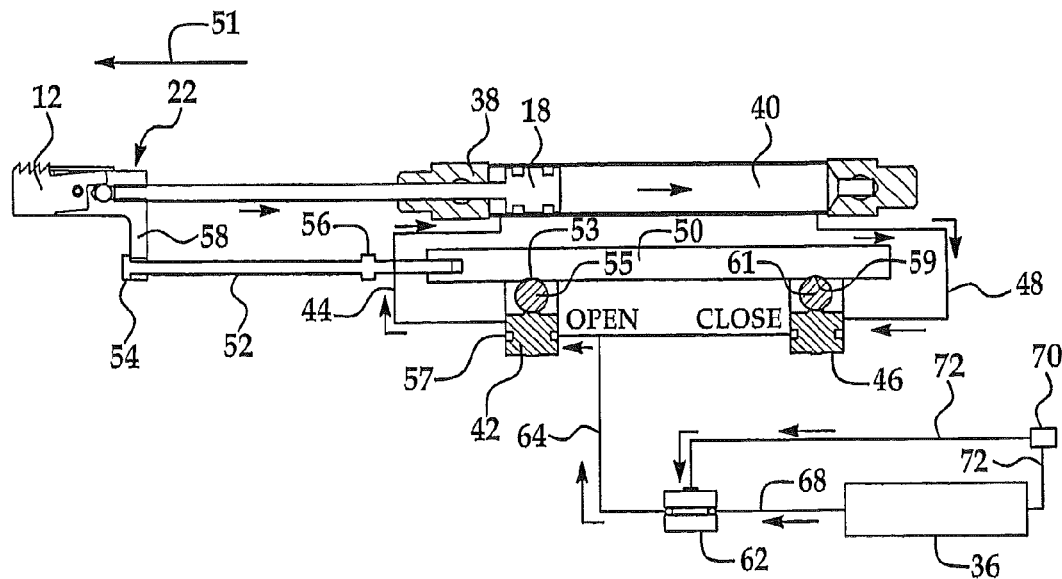
Figure 5C:
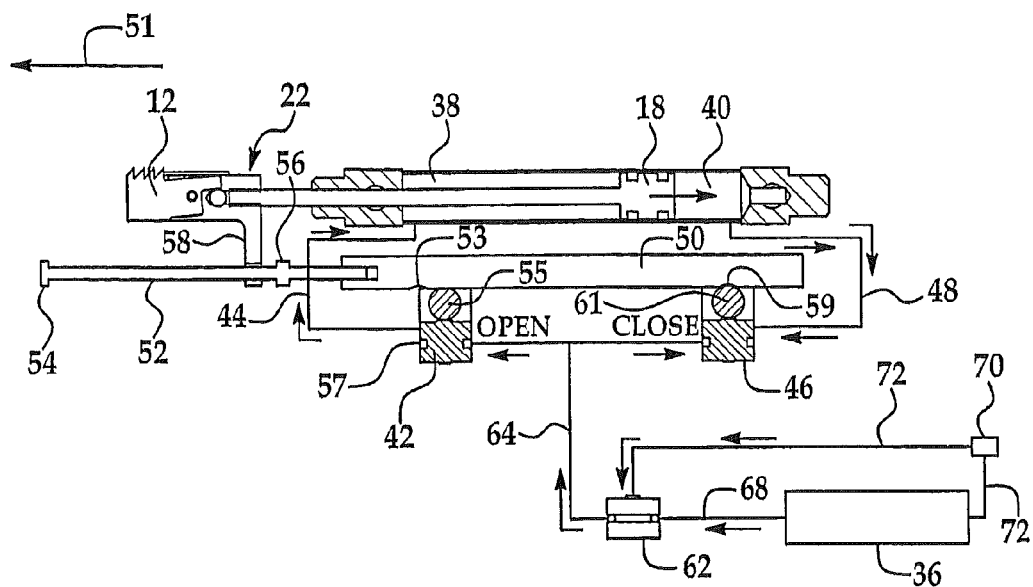
Figure 5D:
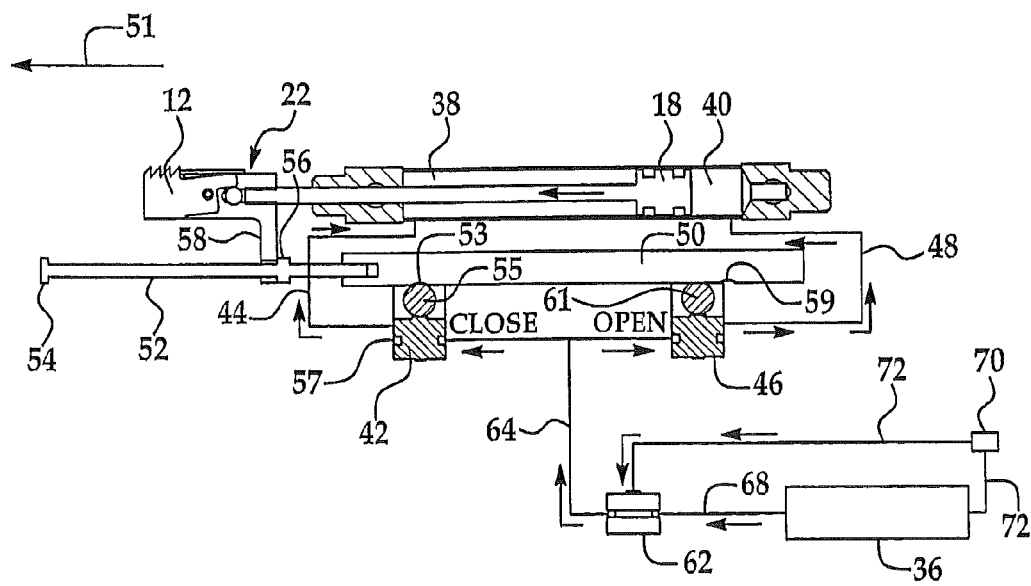

Movement of the saw blade in the direction of arrow 51 continues until portion 58 contacts stop 54 (FIG. 5B) causing the slider 50 to translate into the position of FIG. 5B wherein the feature 53 is no longer aligned with member 55 and the same is depressed into valve 42 causing conduit 64 to be in fluid communication with chamber 38 via valve 42 and conduit 44. At this position, the vent 57 of valve 42 is closed and the piston and saw blade will begin to travel in a direction opposite to arrow 51. Moreover, and at this position valve 46 is closed and the gas of chamber 40 is being released into the atmosphere from a vent of valve 46. It being understood that valve 46 is closed to conduit 64 while valve 42 is open to conduit 64 since a second feature 59 of the slider is no longer positioned to receive a spring biased member 61 of valve 46 thus, causing conduit 64 to be closed to chamber 40 while chamber 40 is open to atmosphere via a vent 63 of valve 46.

In accordance with an exemplary embodiment of the present invention member 61 is biased generally into the direction of slider 50 such that when member 61 is received into feature 59 of slider 50 conduit 64 is closed to chamber 40 and vent 63 is open releasing the gas of chamber 40 while the saw blade travels in the direction opposite of arrow 51. Conversely, and when member 61 is not received into feature 59 of slider 50 (FIG. 5A) conduit 64 is open to chamber 40 and vent 63 is closed and the saw blade and piston travel in the direction of arrow 51.

Movement of the saw blade in the direction opposite of arrow 51 continues (FIG. 5C) until portion 58 now contacts stop 56 (FIG. 5D) causing the slider 50 to translate back into the position of FIG. 5A wherein feature 53 is aligned with member 55 and feature 59 is not aligned with member 61 causing conduit 64 to be in fluid communication with chamber 40 via valve 46 and conduit 48. At this position, the vent 57 of valve 42 is open and the piston and saw blade will begin to travel in the direction of arrow 51. It being understood that valve 46 is open to conduit 64 while valve 42 is closed to conduit 64 since the second feature 59 of the slider is no longer positioned to receive spring biased member 61 of valve 46 thus, causing conduit 64 to be open to chamber 40 while chamber 38 is open to atmosphere via vent 57 of valve 42.

In accordance with an exemplary embodiment of the present invention, this reciprocal movement of saw blade 12, piston 18 and slider 50 will continue until the source of compressed gas released into conduit 64 by valve 62 ceases.

In accordance with an exemplary embodiment and by having the control valve at or proximate to the head member conservation of the gas supply is provided as conduit 68 will traverse through the pole which can be 20 feet or longer thus, and if the pole saw was required to fill or energize conduit 68 with gas each time the pneumatically powered pole saw was activated the source of compressed gas will be depleted quicker. Of course, the pole may be of any length (e.g., 10 feet or shorter, 8 feet or shorter, 6 feet or shorter, etc.). A non-limiting range for the length of the pole may be 5-25 feet. In accordance with an exemplary embodiment conduit 68 is filled with the gas and control valve 62 turns the saw on and off by limiting the amount of gas supplied via source of gas 36.

In one non-limiting exemplary embodiment, control valve 62 is an electro mechanical valve activated by a switch 70 disposed at an end of the pneumatically powered pole saw opposite from the cutting blade. In another non-limiting exemplary embodiment, control valve 62 is a pneumatically activated valve wherein a fluid conduit 72 provides fluid communication with the source of compressed gas and switch 70 allows fluid communication between valve 62 and source of compressed gas 36 wherein the compressed gas will open valve 62 and gas will be supplied to valves 42 and 46. In this embodiment, and in order to conserve the fluid supply of compressed gas 36 conduit 72 is much smaller than conduit 68 and thus only a small amount of gas is wasted each time valve 62 is opened. Furthermore, switch or valve 70 can be operated at a much lower pressure than the pressure passing through conduit 68 and is necessary to manipulate the movement of the piston within the cylinder.

Figure 6:
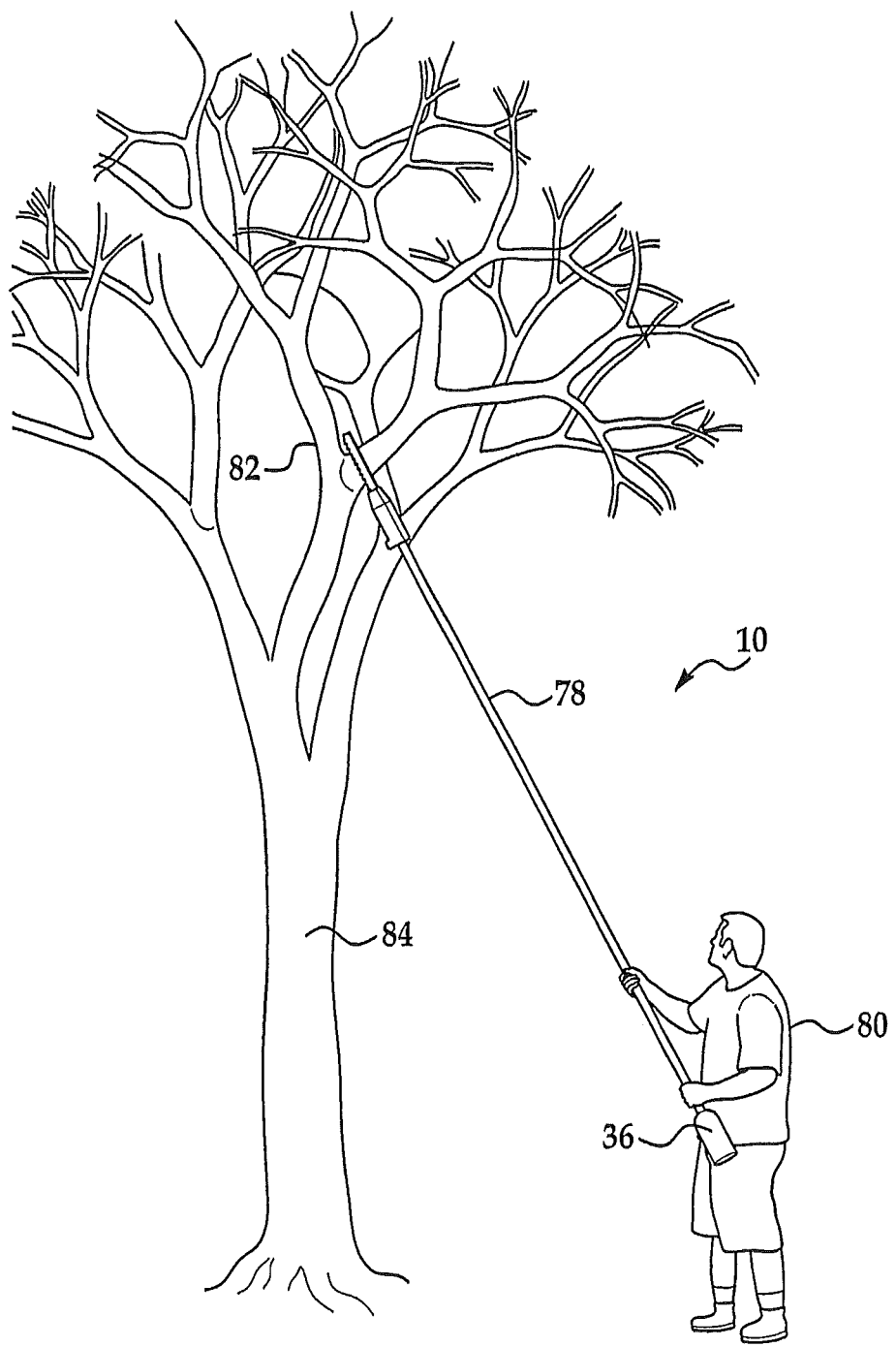
FIG. 6 is a view illustrating one exemplary embodiment of the present invention.

Referring now to FIG. 6 a pneumatically powered pole saw 10 constructed in accordance with an exemplary embodiment of the present invention is illustrated here a source of compressed gas 36 is a bottle secured to an end of a pole 78. In this embodiment, conduit 68 and/or conduit 72 traverse the length of pole 78 until they reach control valve 62, which disposed in or proximate to head portion 14. Thus, a user 80 activates the pneumatically powered pole saw by manipulating switch 70 and the saw is activated to cut a limb 82 of a tree 84. Once the desired task is completed, switch 70 is moved to an off position and the remaining gas is eventually released from the head member.

Figure 7:
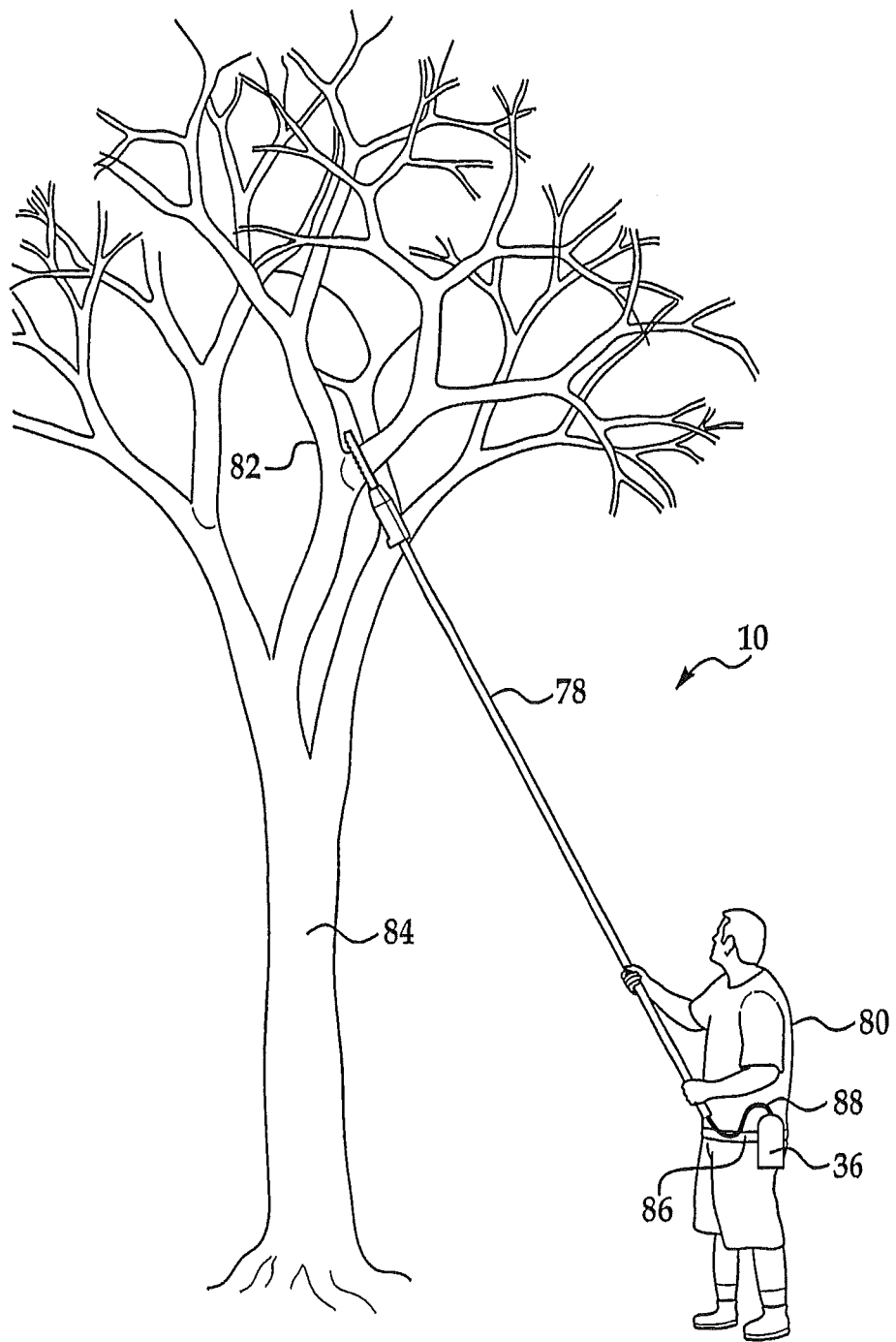
FIG. 7 is a view illustrating another exemplary embodiment of the present invention.
Figure 8:
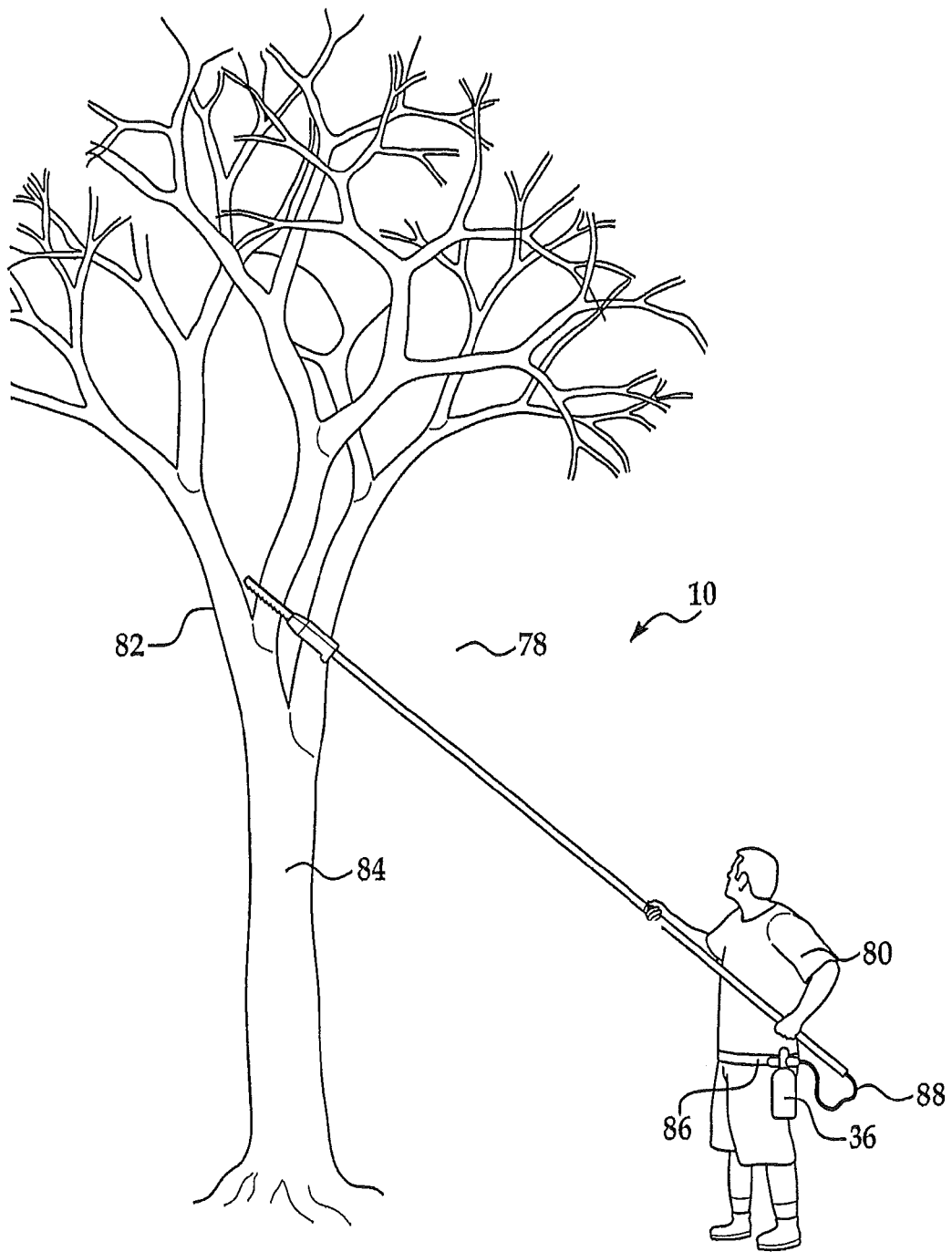
FIG. 8 is a view illustrating an exemplary embodiment of the present invention.

FIG. 7 illustrates an alternative exemplary embodiment, wherein the source of compressed gas 36 is secured to a wearable belt or harness 86 thus, the individual wears the compressed gas and the same is secured to the conduit 68 of the pole via a flexible conduit 88. Here the weight of the compressed gas is not on the end of the pole making the same easy to manipulate and use.

Referring now to FIG. 1A an alternative exemplary embodiment of the present invention is illustrated. Here frame portion 28 further comprises a stop member 120. In an exemplary embodiment, stop member 120 has a pair of arms 122 and a cross member 124 that define a stop for limb that is being cut by the pole saw. For example, and as the blade is drawn towards the stop the teeth of the blade will engage the limb and apply a downward force to the limb which in turn may cause the head member to be drawn upward or in an opposite direction to the force being applied to the limb as the blade travels down towards the stop member. Accordingly, and in order to impart the cutting force to the limb in a downward stroke of the blade the stop member provides a surface to receive a portion of the limb on as the blade travels downward towards the stop member. Alternatively, and as illustrated by the dashed lines in FIG. 1A, the frame portion 28 is configured to extend past roller 30 and enclose the same within a portion of the frame portion so that limbs being cut or not being cut do not interfere with the movement of roller 32.

Referring now to FIGS. 1B-1D alternative configurations of the saw blade are illustrated. FIG. 1B illustrates a straight saw blade wherein a width 130 of the blade from the non-toothed portion 34 and a toothed portion of the blade is essentially the same thickness along an edge 132 that is received within groove 32 of roller 30. Accordingly, and in this embodiment, the teeth of the blade generally act upon a cutting surface in a linear fashion.

Alternatively, and referring now to FIG. 1C, the width 130 of the blade from the non-toothed portion 34 and a toothed portion of the blade is not the same thickness along an edge 132 that is received within groove 32 of roller 30. Accordingly, and in this embodiment, the teeth of the blade generally act upon a cutting surface in a non-linear or curved fashion as the toothed surface also has a curved configuration.

In yet another alternative, and referring now to FIG. 1D, the width 130 of the blade from the non-toothed portion 34 and a toothed portion of the blade is not the same thickness along an edge 132 that is received within groove 32 of roller 30. Accordingly, and in this embodiment, the teeth of the blade generally act upon a cutting surface in a non-linear fashion as the saw blade is reciprocated within a range of motion and the teeth are acting upon a cutting surface.

In addition, and in accordance with one non-limiting exemplary embodiment of the present invention the stroke of the saw blade is approximately 4 inches which has been found to be suitable for tree limb cutting operations. Of course, strokes greater or less than 4 inches are considered to be within the scope of exemplary embodiments of the present invention.

In an alternative exemplary embodiment, the piston may be spring biased into one of the positions illustrated in FIGS. 5A-5D such that one of the valves 42 or 46 is open at an initial starting point and movement to the next position will be caused by the piston overcoming the spring force as well as the gas pressure on one side of the piston. In another exemplary embodiment, a spring biasing member may be positioned on either side of the piston wherein one spring biasing force is greater than the other to maintain one of the positions illustrated in FIGS. 5A-5D such that one of the valves 42 or 46 is open at an initial starting point.

Referring now to FIGS. 9A-11B, a pneumatically powered pole saw 10 constructed in accordance with an alternative embodiment of the present invention is illustrated. Here, referring to FIGS. 9B and 10B and in order to provide fluid communication between the source of compressed gas and chamber 40 a reciprocating valve 132 is provided to allow selective fluid communication between the source of compressed gas and chamber 40 via a conduit 134. In one non-limiting exemplary embodiment the reciprocating valve is a Humphrey Products TAC Valve (See FIGS. 10A and 10B). One non-limiting description of a Humphrey Valve is found in U.S. Pat. No. 6,488,050 the contents of which are incorporated herein by reference thereto. When the reciprocating valve is in a first position (See FIGS. 9B and 10B), a first outlet 136 of reciprocating valve is in fluid communication with a fluid inlet 138 of reciprocating valve which is in fluid communication with an inlet conduit 139 which is in fluid communication with the source of compressed gas to allow fluid communication between the source of compressed gas and chamber 40.

Figure 9A:
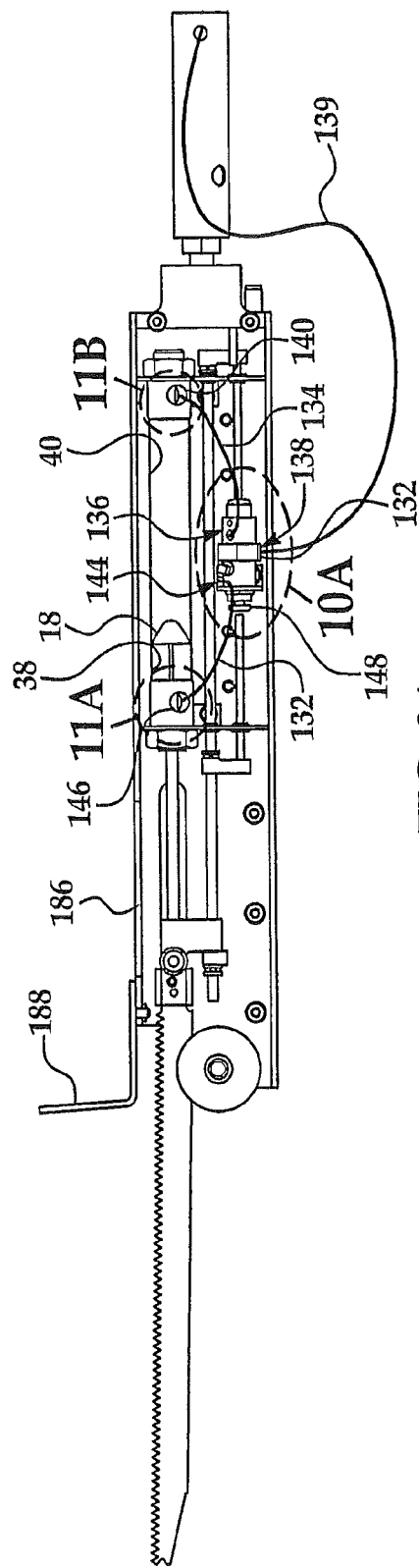
FIGS. 9A-9B are schematic illustrations of alternative embodiments of the present invention.
Figure 10A:
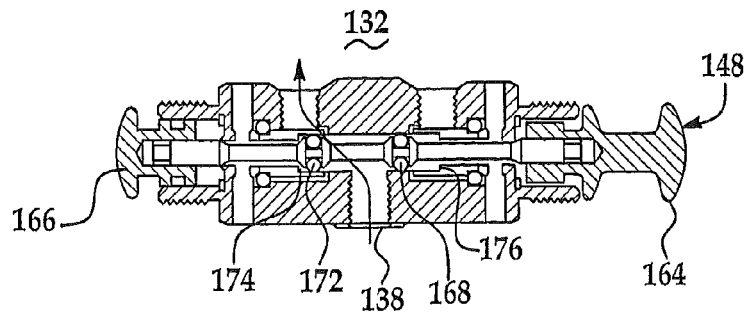
FIGS. 10A-10B are enlarged views of a reciprocating valve shown in FIGS. 9A-9B.
Figure 11A:
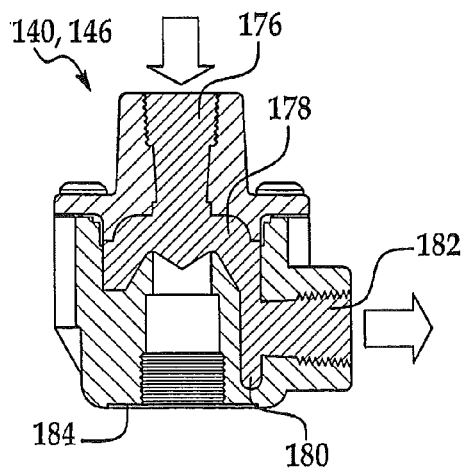
FIGS. 11A-11B are enlarged views showing operational positions of the check valves shown in FIGS. 9A-9B.

Alternatively, and as illustrated by the dashed lines in FIG. 9A as well as in FIGS. 10A and 11A, when the reciprocating valve is in a second position, the first outlet 136 restricts fluid communication between the source of compressed gas and chamber 40 and chamber 40 is in fluid communication with the atmosphere so that the gas in chamber 40 may be released via opening a first check valve 140 disposed on conduit 134 to allow the cutting blade to travel to the second position. In still another embodiment, the first check valve is disposed proximate to chamber 40. Accordingly, and when the reciprocating valve is in the second position, chamber 40 via first check valve 140 allows the fluid in chamber 40 to be released to the atmosphere.

Referring back to FIGS. 9A and 10A and in order to provide fluid communication between the source of compressed gas and chamber 38 a reciprocating valve 132 is provided to allow selective fluid communication between the source of compressed gas and chamber 38 via a conduit 142. When the reciprocating valve is in a second position (See FIGS. 9A and 10A), a second outlet 144 of reciprocating valve is in fluid communication with the fluid inlet 138 of reciprocating valve which is in fluid communication with the inlet conduit 139 which is in fluid communication with the source of compressed gas to allow fluid communication between the source of compressed gas and chamber 38.

Figure 9B:
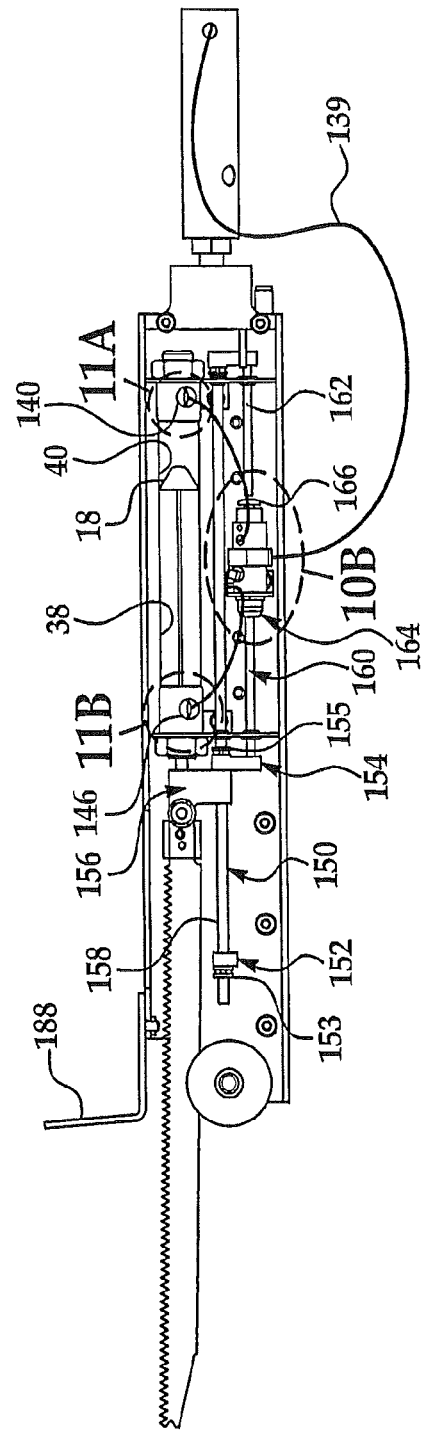
Figure 10B:
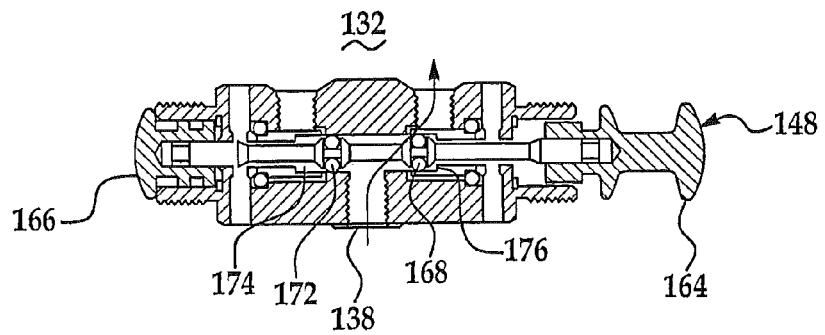
Figure 11B:
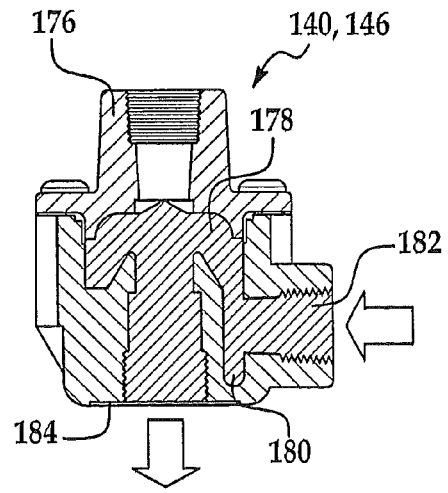

Alternatively, and as illustrated by the dashed lines in FIG. 9B as well as in FIGS. 10B and 11B, when the reciprocating valve is in a first position, the second outlet 144 restricts fluid communication between the source of compressed gas and chamber 38 and chamber 38 is in fluid communication with the atmosphere so that the gas in chamber 38 may be released via opening a second check valve 146 disposed on conduit 142 to allow the cutting blade to travel to the first position. In one non-limiting exemplary embodiment, the second check valve is disposed proximate to chamber 38. Accordingly, and when the reciprocating valve is in the first position, chamber 38 via second check valve 146 allows the fluid in chamber 38 to be released to the atmosphere.

In accordance with an alternative embodiment of the present invention and in order to move the cutting blade in the first cutting direction, the reciprocating valve 132 is in the first position (e.g. gas supplied from source to chamber 40) and the second check valve 146 is opened (e.g. gas vented from chamber 38). Similarly, and in order to move the cutting blade to the second cutting direction the reciprocating valve 132 is in the second position (e.g. gas supplied from source to chamber 40) and the first check valve 140 is opened (gas vented from chamber 40).

In order to provide the movement between the first and second positions of the reciprocating valve 132 an actuator 148 is disposed within the reciprocating valve wherein movement of the actuator 148 causes the reciprocating valve to move between the first and second positions (See FIGS. 9A-10B). In order to effect the movement of the actuator an assembly 150 is slidably mounted in the head member. The assembly also has a pair of fixedly secured stops 152 and 154 wherein a portion 156 of the cutting blade is slidably received upon the assembly. As the cutting blade traverses in the first cutting direction the portion 156 of the cutting blade will contact stop 152 and cause the assembly 150 to move and contact the actuator causing movement of the reciprocating valve to the second position causing first check valve 140 to open thus, the cutting blade will then traverse in the second cutting direction wherein portion 156 will contact stop 154 and cause the assembly to move and contact the actuator causing movement of the reciprocating valve to the first position causing second check valve to open thus, the cutting blade will then traverse to the first cutting position. This reciprocal movement of the cutting blade will continue until the source of gas is no longer fluidly coupled to the inlet 132 of the reciprocating valve.

As illustrated in FIGS. 9A and 9B, the assembly further comprises a main rod member 158 for slidably receiving the portion 156 of the cutting blade and a pair of contact members 160 and 162 each fixedly secured to the main rod member 158. Moreover, the actuator comprises a pair of contact sides 164 and 166 (See 10A and 10B) associated with the pair of contact members 160 and 162 wherein contact member 160 contacts contact side 164 when the portion 156 of cutting blade makes contact with stop 154 causing assembly to move in the second cutting direction, and similarly, contact member 162 contacts contact side 166 when the portion 156 of cutting blade makes contact with stop 152 causing assembly to move in the first cutting direction. It being understood that the pair of contact members 160 and 162 are not fixedly secured to the contact sides 164 and 166 of the actuator such that when contact member 160 is in contact with contact side 164 a spaced relationship or gap exists between contact member 162 and contact side 166. Similarly, when contact member 162 is in contact with contact side 166 a spaced relationship or gap exists between contact member 160 and contact side 164.

In one non-limiting alternative embodiment of the present invention a pair of biasing members 153 and 155 disposed proximate to stops 152 and 154 provides portion 156 to be biased in the opposite direction when portion 156 makes contact with stop 152 or 154. It being understood that biasing members 153 and 155 are disposed on the side opposite to contact surface between portion 156 of and respective stop 152 or 154. Referring to FIG. 9A, when portion 156 makes contact with stop 152 assembly moves to the first cutting direction and portion 156 is subsequently biased to the second cutting direction due to the force provided by biasing member 153. Similarly, referring to FIG. 9B, when portion 156 makes contact with stop 154 assembly moves to the second cutting direction and portion 156 is subsequently biased to the first cutting direction due to the force provided by biasing member 155.

Referring to FIGS. 9A-11B operation of an alternative embodiment of the present invention is illustrated. It being understood that FIGS. 11A and 11B illustrate check valves 140 and 146 in a venting position (FIG. 11B) wherein the gas from the piston chambers 38, 40 moves the diaphragm 178 and in a supply position (FIG. 11A) wherein compressed gas is supplied via inlet 176 and the same moves the diaphragm 178 to cover the valve seat 180 and prevent fluid communication to outlet 184. In other words the configurations of valve 140 and 146 are similar thus, two figures are used to show the two positions of the two valves each being in selective fluid communication with either side of the piston chamber. It being further understood that outlets 184 of valves 140 and 146 are open to atmosphere to allow for unimpeded movement of the saw blade by the alternating supply of the compressed gas to the piston chambers at either side of the movable piston. In accordance with an exemplary embodiment, the diaphragm 178 is constructed out of a resilient pliable material such as rubber or equivalents thereof such that the same can be moved by the gas from chambers 38 and 40 or the supply inlet 176. FIG. 9A illustrates the saw blade moved in the first cutting direction 157. During the traverse from the second cutting direction (opposite to arrow 157) to the first cutting direction reciprocating valve 132 is in the first position (See FIG. 10B) wherein second check valve 146 is open (FIG. 11B) thereby venting gas from chamber 38 to the atmosphere while first outlet 136 is in fluid communication with inlet 138 allowing fluid communication between the source of compressed gas and chamber 40 via check valve 140 (FIG. 11A) thus piston 19 and the saw blade travel in the first cutting direction. It being understood that in order to effect movement towards the first cutting direction the second outlet 144 is closed to conduit 142 and the first outlet is in fluid communication with conduit 134 since a first seal 168 is seated within a first seat 170 thereby opening first outlet 136 thus, causing conduit 134 to be in fluid communication with chamber 40. Similarly, a second seal 172 is unseated from a second seat 174 thereby sealing second outlet 144 thus, causing conduit 146 to be closed to chamber 38 while chamber 38 is open to atmosphere via second check valve 146 (FIG. 11B).

Referring now to FIGS. 9B and 11B, second check valve 146 is in an un-actuated position (FIG. 11B) configured to release gas from chamber 38 to the atmosphere when compressed gas is not entering through a conduit inlet 176 thereby causing a diaphragm 178 to not close against a valve seat 180 so that compressed gas from chamber 38 via piston passage 182 may vent directly to the atmosphere through an atmosphere outlet 184 instead of venting through the entire length of conduit 142. Moreover, the pressure caused by the piston travelling in the direction of arrow 157 from the position in FIG. 9B to the position in FIG. 9A causes the diaphragm 178 in valve 146 to move up to the position illustrated in FIG. 11B. This is particularly advantageous because allowing the compressed gas to vent from chamber 38 more quickly allows less back-pressure to retard the movement of the piston 18. Similarly, referring to FIGS. 9B and 11A and as the blade travels in a direction opposite to arrow 157, first check valve 140 is in an actuated position (FIG. 11A) configured to supply compressed gas to chamber 40 through the conduit inlet 176 thereby causing diaphragm 178 to close against valve seat 180 and diaphragm 178 has a peripheral configuration so that compressed gas may be supplied to chamber 40 via piston passage 182 and as illustrated by the arrows in FIG. 11A since the compressed gas forces the diaphragm against valve seat 180.

In one non-limiting alternative embodiment of the present invention first and second check valves 140, 146, are disposed proximate to chambers 40, 38, respectively, in order maintain the least amount of back pressure as possible between supplying and venting the compressed gas to chambers 38 and 40.

Referring now to FIGS. 9B and 10A movement of the saw blade in the second cutting direction opposite to arrow 157 is illustrated. During the traverse from the first cutting direction to the second cutting direction reciprocating valve 132 is in the second position (See FIG. 10A) wherein first check valve 140 is open (FIG. 11B e.g., no gas provided to inlet 176) thereby venting gas from chamber 40 to the atmosphere while second outlet 144 is in fluid communication with inlet 138 allowing fluid communication between the source of compressed gas and chamber 38 via valve 146 in the position illustrated in FIG. 11A thus piston 18 and the saw blade travel in the second cutting direction. It being understood that in order to effect movement towards the second cutting direction the first outlet 136 is closed to conduit 134 and the second outlet 144 is in fluid communication with conduit 142 since the second seal 172 is seated within the second seat 174 thereby opening second outlet 144 thus, causing conduit 142 to be in fluid communication with chamber 38. Similarly, the first seal 168 is unseated from the first seat 170 thereby sealing first outlet 136 thus, causing conduit 134 to be closed to chamber 40 while chamber 48 is open to atmosphere via first check valve 140.

Referring now to FIGS. 9A and 11B, and as the blade moves in the second cutting direction, first check valve 140 is in an un-actuated position configured to release gas from chamber 40 to the atmosphere when compressed gas is not entering through the conduit inlet 176 thereby causing the diaphragm 178 to not close against the valve seat 180 so that compressed gas from chamber 40 via piston passage 182 may vent directly to the atmosphere through an atmosphere outlet 184 instead of venting through the entire length of conduit 134. This is particularly advantageous because allowing the compressed gas to vent from chamber 40 more quickly allows less back-pressure to retard the movement of the piston 18. Similarly, referring to FIGS. 9A and 11A, second check valve 146 is in an actuated position configured to supply compressed gas to chamber 38 through the conduit inlet 176 thereby causing diaphragm 178 to close against valve seat 180 so that compressed gas may be supplied to chamber 38 via piston passage 182.

In accordance with an alternative embodiment of the present invention, this reciprocal movement of cutting blade 12, piston 18, reciprocating valve 132 and assembly 150 will continue until the source of compressed gas released into the inlet conduit 139 in fluid communication with inlet 138 of reciprocating valve ceases.

Referring now to FIGS. 9A and 9B an alternative embodiment of the present invention is illustrated. Here a frame portion 186 comprises a stop member 188 secured to the end of the frame and extending outward toward the end of the cutting blade 12. Stop member 188 defines a stop for a limb that is being cut by the pole saw. For example, and as the blade is drawn towards the stop the teeth of the blade will engage the limb and apply a downward force to the limb which in turn may cause the head member to be drawn upward or in an opposite direction to the force being applied to the limb as the blade travels down towards the stop member. Accordingly, and in order to impart the cutting force to the limb in a downward stroke of the blade the stop member provides a surface to receive a portion of the limb on as the blade travels downward towards the stop member.

Referring now to FIGS. 12A-19C other alternative embodiments of the present invention are illustrated. In one embodiment, the main valves are moved by an intermediary device called a pilot valve, which delivers compressed gas to actuate the main valves. Utilizing pneumatic pilot valves to actuate pneumatic main valves instead of directly actuating by mechanical arms, rods levers or sliders is desirable in that pilot valve pneumatic actuation of the main valves does not leave the main valves in an undetermined state, that is, in a "dead zone" position wherein all motion stops. A dead band or dead zone is a place where the valves are changing fluid flow states. This valve transition is where valves can stall and reciprocating motion can stop. This dead zone transition problem is particularly noticeable at extremes of reciprocation speed. For example, at slow speed, where valve actuators are moving very slowly, the main valves can pass too slowly through this dead zone state wherein both main valves' ports are partially open and partially closed. Since there is not sufficient momentum of the mechanical main valve actuators during slow speed to move the valves quickly through this state the valves stop in the dead zone where compressed gas is applied equally to both sides of the piston cylinder, and the piston and valves are therefore not being driven either direction and thus they are stalled.

In this embodiment, the pneumatically powered pole design utilizes pilot valves that provide compressed gas to actuated main valves. The primary advantage in the use of compressed gas pilot valves in this embodiment is exceptionally reliable actuation of the main valves, especially given the wide variation of reciprocation speed and with no rotational mass or centrifugal force to assist in the valve transition dynamics. Pneumatic actuation eliminates the problem of dead zone failure.

At the end of travel of the piston, a pilot valve is actuated which provides compressed gas energy to a main valves assembly, forcing the main valves through the dead zone and into proper state positions because of the steady force applied by the compressed gas. The main valves do not bounce back from their limits of travel at high reciprocation speeds because the gas pressure provided by the pilot valve holds the main valve momentarily in position. Nor will the main valves stall in the dead zone at slow speeds because the compressed gas from the pilot valve continues to force the main valves into proper position until the main valves' state transition has been completed.

Figure 12C:
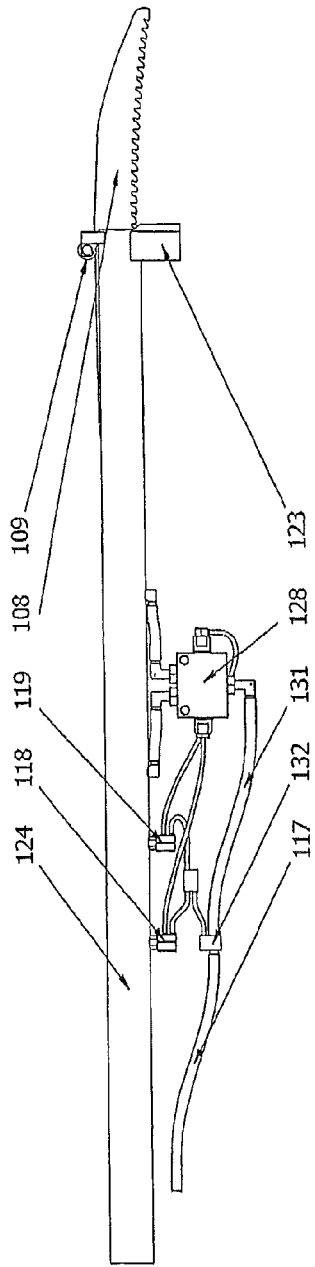
Figure 12D:
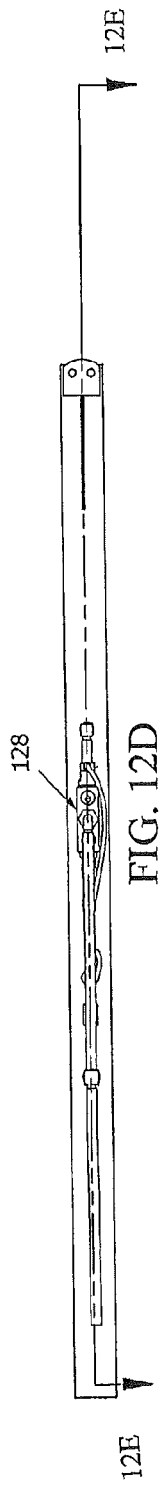
Figure 12E:
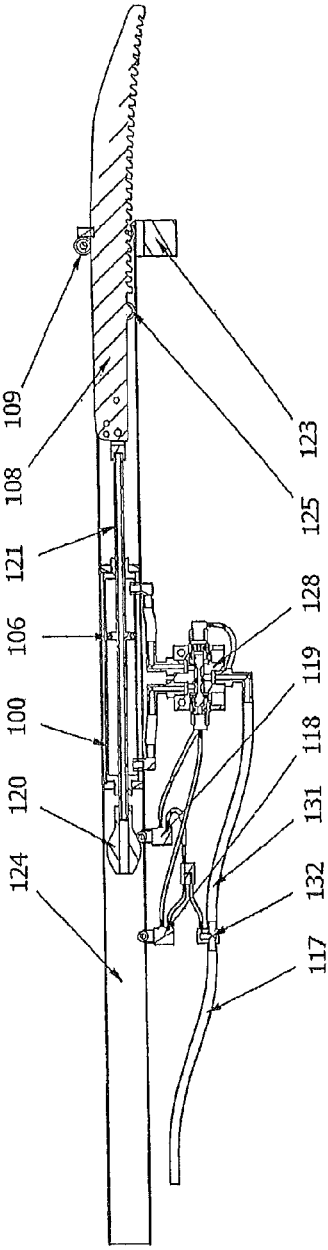

FIGS. 12A-18E illustrate an embodiment of a pneumatically actuated pole saw with pilot valve actuation of the main valves. FIGS. 12A and 12B illustrate an external assembly view and the physical relationships of various components including pole 124, blade 108, blade roller 109, limb stop 123, main valves assembly 128, pilot valve 118, pilot valve 119, compressed gas inlet 117, and compressed gas splitters 132.

Figure 13A:
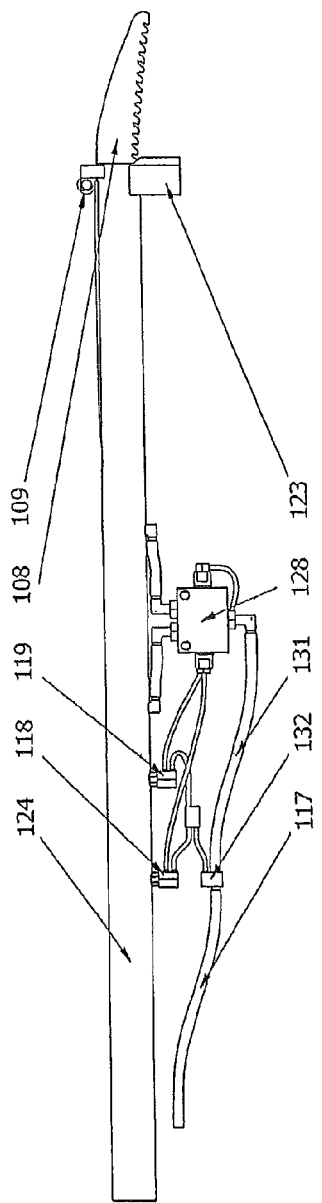
Figure 13B:
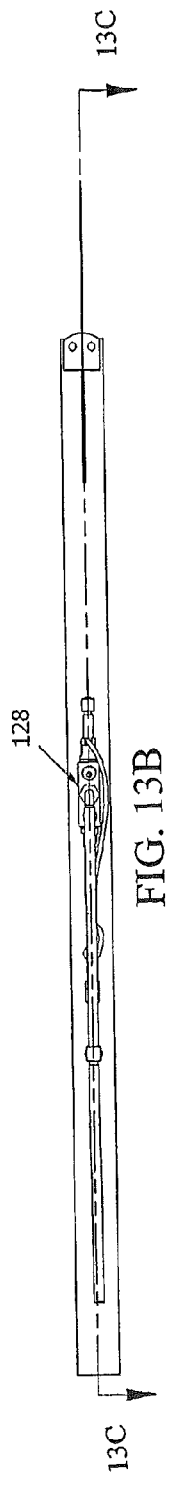
Figure 13C:
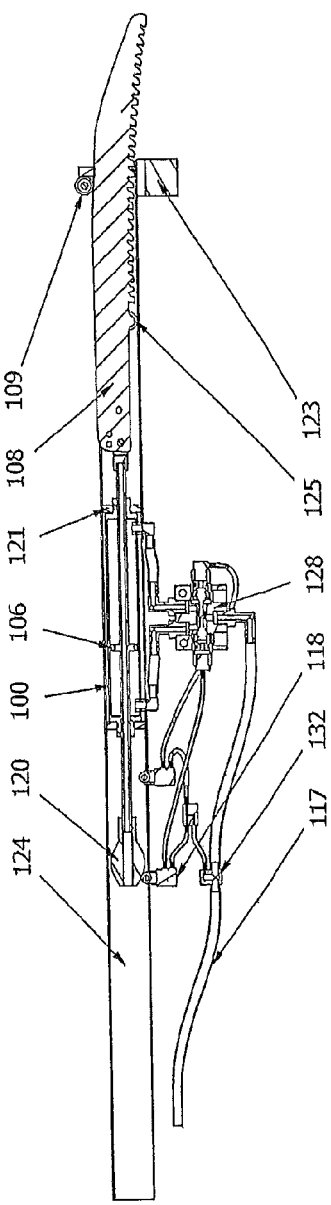

The FIGS. provide top level and sectional views through which view internal components including pilot valve actuator 120, piston cylinder 100, piston 106, piston rod 121 and main valves assembly 128 can be viewed. The internal views show the piston pushing the blade outward from the pole and the end of travel of piston 106 in this blade push direction pilot valve actuator 120 makes contact with pilot compressed gas actuator 119 (FIG. 12E) and FIG. 13C illustrates the reciprocating piston 106 at the end of travel in the blade pull direction where pilot valve actuator 120 attached to piston rod 121 is in contact with pilot valve 118.

At least FIGS. 14A, 14B, 15A, 15B, illustrate details of the reciprocal functioning. As illustrated, the piston cylinder 100 is held securely to pole 124 by a mount 122 so that compressed gas energy supplied alternatively to each side of the piston 106 by main valves assembly 128 forces piston rod 121 attached to blade 108 through coupling 126 and clevis pin 107 to reciprocate thereby provide gas powered cutting motion to the blade.

Figure 14A:
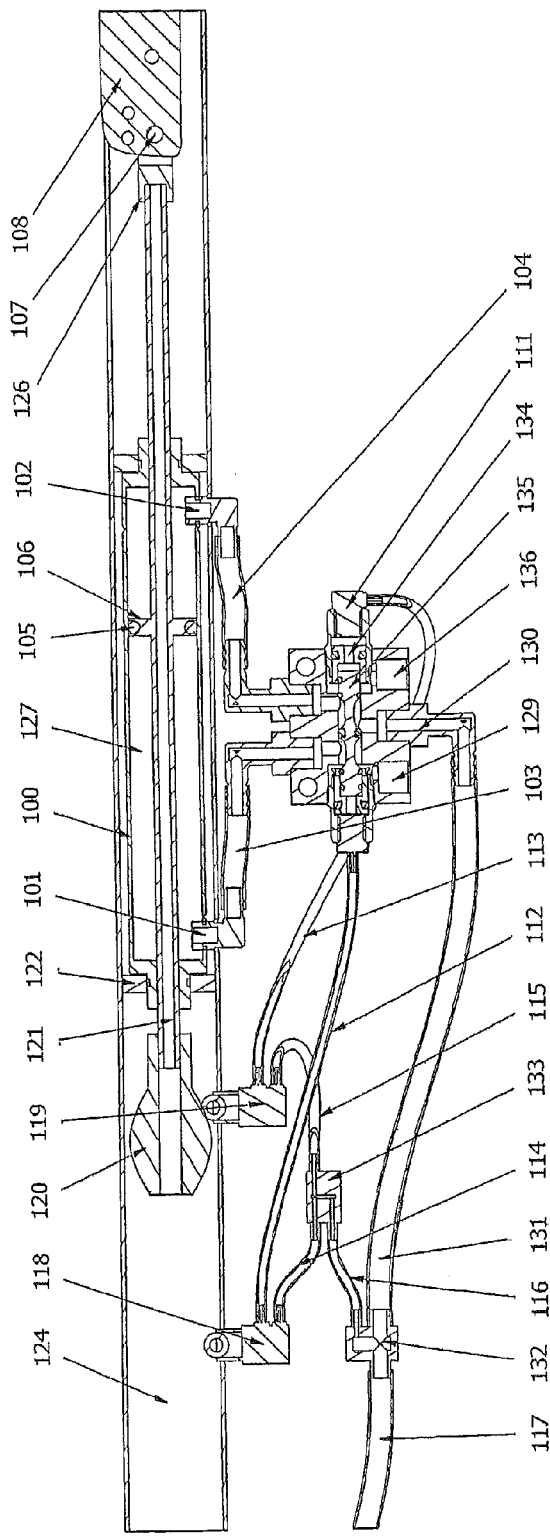
Figure 14B:
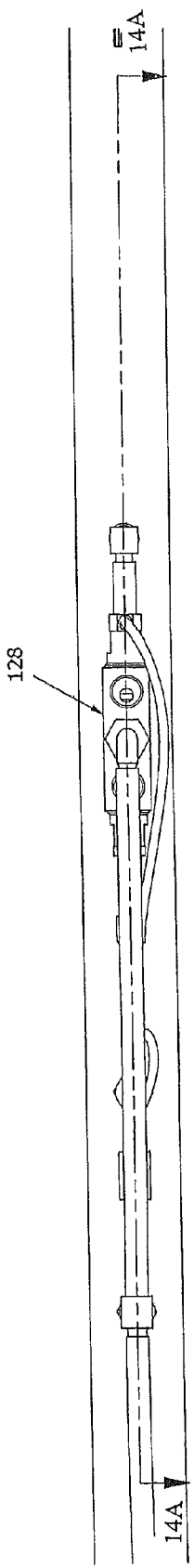
Figure 15A:
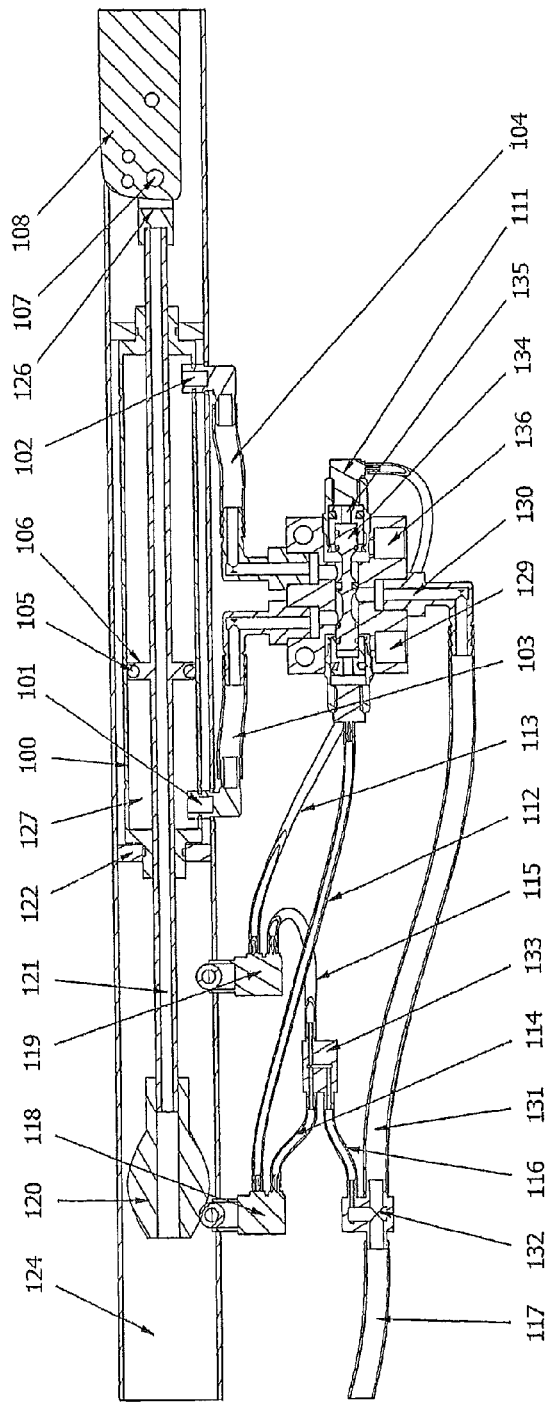
Figure 15B:
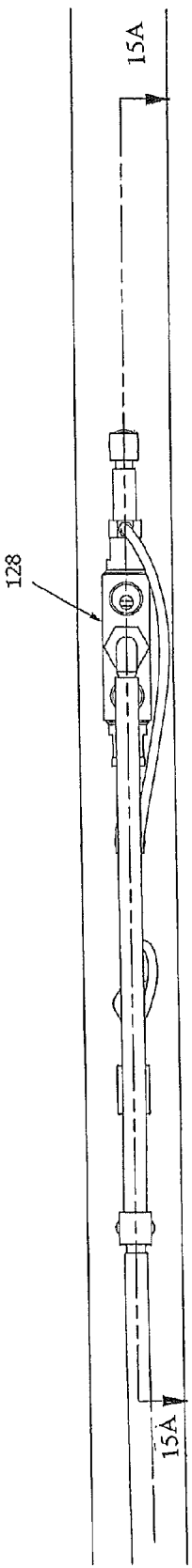

Referring at least to FIG. 14A, pneumatically actuated main valve 128 has an internal shuttle 135, which is compressed gas actuated, and reciprocates between two distinct locations by means of gas pressure applied to opposite ends of 135 through tubing from two small mechanically actuated pilot valves 118 and 119 positioned so they are alternatively actuated at the ends of travel of the main piston rod 121. The main valve 128, is seen from non-cutaway views of at least FIGS. 14B and 15B. FIGS. 14A and 15A show the main piston 106 in alternate positions in order to illustrate a full reciprocating cycle and the interaction of the pilot valves with the pneumatically actuated main valves of assembly 128.

FIG. 15A shows when compressed gas comes through the pole saw via tube 117. A portion of the gas then comes through primary gas flow splitter 132 to tube 116 into gas flow splitter 133 through tubes 114 and 115 to the mechanically actuated pilot valves 118 and 119 while most of the gas flow volume is conducted from primary flow splitter 132 through tube 131 and fitting 130 into the main 4-way valve 128. Compressed gas coming into main 4-way valve 128 is directed past the internal shuttle 135 and out of main valve 128 through tube 104 to inlet fitting 102 into the piston cylinder where it applies gas pressure to slideable piston 106. Gas pressure is kept from leaking around slideable piston 106 by means of piston seal 105. Compressed gas in the chamber on the opposing side of piston 106 is vented out of chamber 127 through fitting 101 into tube 103 and out of main valve 128 through vent orifice 129. Gas pressure in the piston chamber moves piston 106 attached to piston rod 121, which is linked to cutting blade 108 through blade attach rod and bracket 126 and 107, forces saw blade 108 to move in the pull direction.

After some travel in the pull direction the actuator 120 attached to the end of piston rod 121 opposite from the end where blade 108 is attached contacts pilot valve 118. Pilot valve 118 when contacted by mechanical actuator 120 directs a pulse of gas from splitter 133 through tube 114 then through pilot valve 118 into tube 112 and into main valve 128 which pulse of gas moves internal shuttle 135 located within main valve 128 such that the primary gas supply coming into main valve 128 through fitting 130 is redirected to tube 103 and fitting 101 into chamber area 127 of cylinder 100 and applies pressure against piston 106 forcing attached piston rod 121 to move saw blade 108 in the push direction and pilot valve actuator 120 attached to rod 121 to move in direction toward pilot valve 119. When gas pressure is increased in piston chamber 127 gas pressure on the opposite side of piston 106 and inside of cylinder 100 needs to be vented to reduce pressure that would oppose movement of piston 106 in the blade push direction, and the vent gas moves through fitting 102 into tube 104 though main valve assembly 128 and out into the atmosphere through vent orifice 136.

Referring now to at least FIG. 14A, when valve actuator 120 makes contact with pilot valve 119 a pulse of gas is conveyed from splitter 133 through tube 115 then through the opened valve 119 to tube 113 and on to connector 111 into main valve 128, which pulse of gas moves internal shuttle 135 such that the primary gas supply coming into valve 128 through fitting 130 is then directed to tube 104 and fitting 102 into the piston chamber providing pressure against piston 106 and forcing piston rod 121 connected through blade attach bracket 126 to blade 108 and causing saw blade 108 to return to a powered pull cutting stroke.

Accordingly and in this embodiment, pilot valves are used to gas actuate a main valves assembly to reciprocally drive a piston linked to the cutting blade of the pole saw.

Referring now to at least FIGS. 16-19C the functionality of the valves and the pistons and associated motion dynamics of various embodiments of alternative exemplary embodiments of the present invention are illustrated wherein detailed views illustrate the position of the piston and valves.

Figure 16:
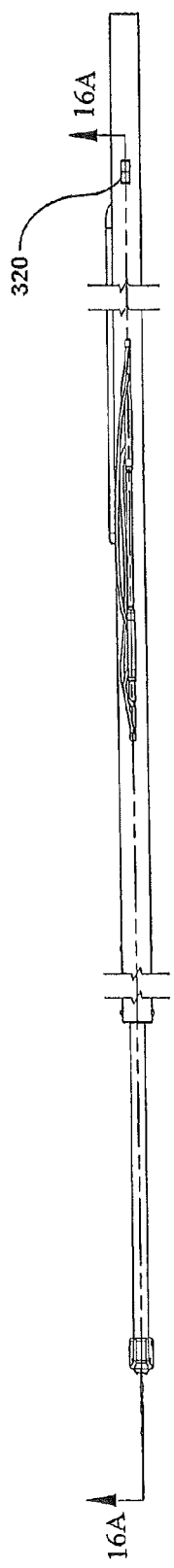
Figure 16A:
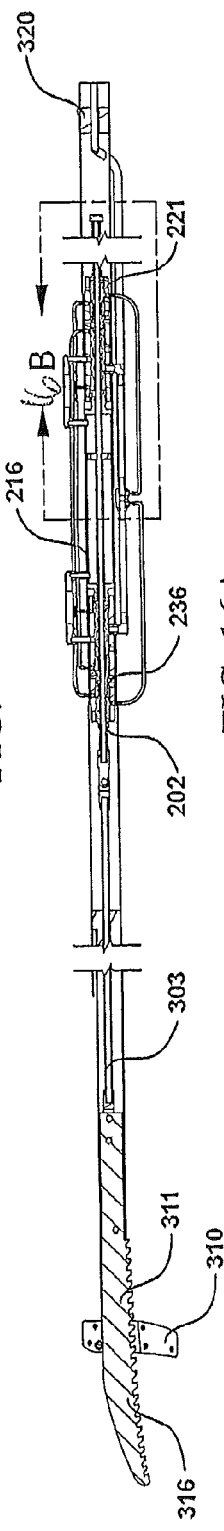
Figure 16B:
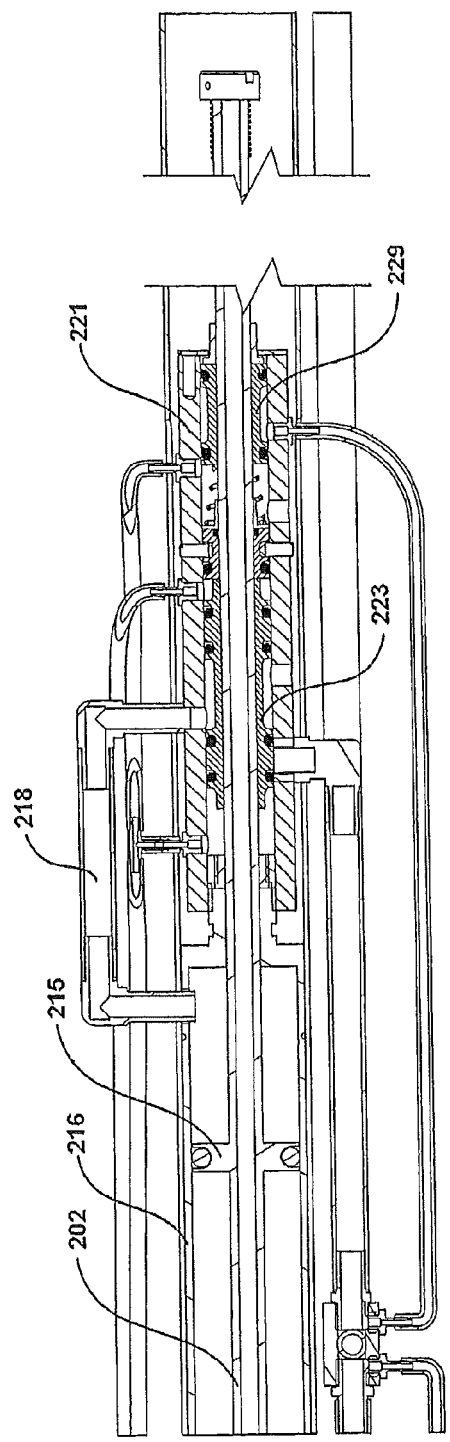

FIG. 16A shows a portion of the valving with the piston in mid travel and the pilot valves venting. FIG. 16E also shows the piston in mid-travel and the pilot valves venting and illustrates the valve assembly on the blade side of the piston cylinder.

FIGS. 17B and 17E illustrate expanded views of the valve assemblies on opposite ends of the piston chamber. FIG. 17E illustrates that the piston is fully retracted in the blade pull stroke position and pilot valve 236 is shown as being actuated.

FIGS. 18B and 18E are similar views to FIGS. 17B and 17E however, the blade is in the fully extended position and pilot valve 229 is shown as being actuated.

Referring now to FIGS. 19-19C, ball bearings are illustrated as being attached to the blade. FIG. 19C shows details of the blade stop end with the pole bearing and blade in conjunction with a limb in order to describe limb cutting action by the blade.

In another embodiment, the piston cylinder and valves are shifted away from the blade though the use of a rod extension 303, and piston rod 202 (See at least FIG. 16A). Through the use of a light-weight rod extension 303 the weight of the piston and valve assemblies are moved away from the blade end of the pole. Repositioning the weight in this manner makes it easier for the operator to balance, align and position the pneumatic pole saw for cutting in a tree.

In accordance with one embodiment of the present invention, the piston cylinder 216 and related valve sub-assemblies 221 and 236 are repositioned away from the cutting blade 316 by inserting a light weight rod extension 303, between the piston rod 202 and the blade 316. This allows the weight of the piston cylinder 216 and valves closer to be repositioned closed to the person holding the other end of the pole, which is opposite from the blade end of the pole. Accordingly, the center of weight of the apparatus is shifted back from the blade end of the pole making it easier for the operator to hold, position, and balance the pole saw in operation. In an alternative embodiment, this shifting in weight could also be achieved by means of cable and pulley to couple reciprocating power between the actuator and blade.

In another embodiment of the present invention and as illustrated in at least FIGS. 16-16E the pilot valves 236 and 221 and associated main valves, 210 and 223 located on the same axis as the piston rod 202, thereby reducing the physical diameter of the pole saw so that the valves can be located within the pole saw housing and thus reduce the diameter and/or profile of the pole saw such that is can more easily reach between branches of a tree. As illustrated in the attached FIGS., the pilot valves 236 and 221 and associated main valves, 210 and 223 are positioned about or axially about the piston rod 202 extending from opposite sides of the piston 215. The pilot valves 236 and 221 and associated main valves, 210 and 223 are also configured such that the piston rod 202 can be slidably received within the pilot valves 236 and 221 and associated main valves, 210 and 223 such that reciprocal movement of the piston 215 and rod(s) 202 can be achieved. In addition, the pilot valves 236 and 221 and associated main valves, 210 and 223 are also slidably received within housings 259 and 271 threaded onto their respective ends of piston cylinder 216. Still further, the housings 259 and 271 and the piston cylinder 216 are received within the housing or pole of the pole saw.

In alternative embodiments, the pilot valves 236 and 221 and associated main valves, 210 and 223 can be located on the same side of the piston cylinder or adjacent to the piston cylinder.

The placing of these pilot and main valves on axis such that the piston rod goes through the center of the pilot and main valves allows the valves to be in close proximity to the piston cylinder while still being inside the pole. In contrast and as illustrated in FIGS. 12A-15B, the main valves assembly 128 is in close proximity to the piston cylinder to optimize power efficiency but because neither main valves assembly 128 nor associated pilot valves 118 and 119 are inside of the pole the overall saw dimensions in this portion of the pole saw are larger than those illustrated in FIGS. 16-18E.

Although FIGS. 16-19 and 19B illustrate external tubing, this is merely provided as a non-limiting embodiment to illustrate and describe the pneumatic gas flow in each of the tubes. It is, of course, understood that in one non-limiting exemplary embodiment, these tubes will be in intimately close proximity to the pole and/or internal to the housing of the pole.

As shown in FIGS. 16-18E, the main valves assembly have been separated into two valve subassemblies. In FIG. 12-15B the main valves assembly had the 4 way valves connected together so that if one moved to a new state the opposing one moved simultaneously. In FIGS. 16A-18E each main valve in the valve subassembly has a pilot valve nearby and both main and pilot valve are housed in the cylinders to form valve subassemblies 221 and 236. These valve subassemblies are threaded onto their respective ends of piston cylinder 216. Placing the valve subassemblies at opposite ends of the piston cylinder reduces the distance between the individual main valves and their respective piston cylinder gas inlets, improves power efficiency by reducing compressed gas losses during main valve switching. This improvement in power efficiency is due to close physical proximity and shorter coupling tubes.

Alternative embodiments of the pneumatic valve architecture in addition to those shown in the embodiments of the attached FIGS. These alternative embodiments would employ separate pilot valve or valves to actuate compressed gas driven main valves. One such alternative embodiment would be to place both main valves on the same end of the piston cylinder, still actuating by pilot valves on the same end or on opposite ends of the piston cylinder. Such valve architectures would vary in power efficient, in complexity of valve architecture, and in centers of weight.

As illustrated in at least, FIGS. 16A-16B, 16D and 16E each end of piston cylinder 216 has attached to it one of the two valve sub-assemblies 236 and 231. Each of these valve assemblies includes a pilot valve, a main valve, and associated conductive tubing. In one non-limiting exemplary embodiment, the valve subassemblies are attached by thread to the ends of the piston cylinder. On one end, the end closest to blade 316, is located valve sub-assembly 236 containing pilot valve 205 and main valve 210. On the other end of the piston cylinder valve sub-assembly 221 containing pilot valve 229 and main valve 223 is located.

As illustrated in at least FIGS. 18D and 18E piston 215 attached to piston rod 202, has finished moving in blade push direction whereby blade 316 is fully extended outward. A spring 257 (FIG. 18B) moved by piston rod end 258 has contacted bushing 255 and pushed it into pilot valve 229, which has released compressed gas which has flowed from inlet tube 256 into inlet gas manifold 241 to gas tube 246 through the now actuated pilot valve 229 into tube 209 to be conducted to fittings 220 of main valve 223 and also from fitting 220 to inlet fitting 253, (See FIG. 18E), and into the actuation side of the other main valve 210. Main valve 223 is forced by pilot gas pressure to move away from the piston cylinder 216 and moves into a position to block gas from inlet tube 256 through fitting 248 while main valve 223 simultaneously vents gas from the piston chamber through transfer tube 218 through main valve 223 and out vent 249. Pilot gas from valve 229 supplied as described through tube 209 has simultaneously passed through tube 209 to fitting 253 and into main valve 210 actuating 210 toward piston cylinder 216, main valve 210 thereby allowing compressed gas from inlet tube 256 through manifold 241 through tube 239 into now open main valve 210 into transfer tube 211 into the piston cylinder to apply gas pressure onto this side of the piston chamber and forcing the piston 215 with O-ring seal 240 to now transition to an opposite direction which will result in force being applied through piston rod 202 which is linked mechanically through rod extension 303 to the cutting blade 316 and which results in now pulling the cutting blade inward and toward the piston cylinder 216.

Referring to FIGS. 17-17E, as the piston continues in this blade pull direction spring 201 mounted on piston rod 202 will eventually contact bushing 203 forcing pilot valve 205 (FIG. 17E) to move toward valve stop 208, compressing pilot valve return spring 232 and repositioning pilot valve 205 such that compressed gas from manifold 241 through tube 234 into fitting 231 is conducted through now actuated pilot valve 205 to through fitting 206 into tube 207 simultaneously providing compressed gas to main valve 210 through fitting 212 and also into main valve 223 through fitting 224. Compressed gas from pilot valve 205 thereby forces main valve 210 to moves in a direction outward and away from piston cylinder 216, main valve 210 thus being forced into a new position which blocks compressed gas from manifold 241 through tube 239 from passing out of fitting 238. Main valve 210 does now allow compressed gas on the adjacent side of the piston cylinder to vent out through transfer tube 211 and through main valve 210 and out to atmosphere through vent 236.

While main valve 210 has been actuated to vent the adjacent side of piston chamber 216, main valve 223 has been simultaneously activated by pilot valve 205 through tube 207 to move in a direction which allows compressed gas from manifold 241 through tube 247 to fitting 248 through main valve 223 into transfer tube 218 to be conducted into the piston cylinder. Compressed gas flowing into the piston cylinder will force the piston 215 in a direction that allows for a push stroke of the piston rod linked to the cutting blade 316. When this push stroke of the piston reaches its limit of travel pilot valve 229 will again be actuated by spring 257 as shown in FIGS. 18-18E the reciprocation cycle will begin again to now repeat the pull stroke motion linked to the cutting blade 316 through connecting rod 303. The above has described a full cycle of reciprocating motion of the pilot valve controlled independently gas actuated main valve architecture of this embodiment of pneumatically powered pole saw.

Referring now to FIGS. 19-19C views and in some instances sectional views of a rectangular pole section 304 is provided. Of course, other configurations in addition to rectangular are contemplated. Section 304 is the portion of pole a rectangular aluminum extrusion within which the cutting blade is attached to rod extension 303 which in turn is mechanically linked to piston rod 202 to transfer reciprocating power from the actuating piston 216 to cutting blade 316 as shown in as least FIG. 16A. In one embodiment, there is a pin mounted roller bushing 312 mounted at the end of the pole 304 which, in combination with bearing sets 321 and 322, function to guide blade 316 while minimizing frictional resistance to the reciprocating motion of blade 316. Bushing 312 further constrains the directional force on blade 316, which occurs when blade 316 is cutting a limb 317 shown in FIG. 19C.

In one non-limiting embodiment, the bearing sets 321 and 322 each comprise two ball bearings, one located on each side of the blade 316, the individual bearings of each set are attached together by press pin and with bearing sets 321 and 322 located on the end of blade 316 which is in proximity to the coupling point of rod extension 303. Bearing sets 321 and 322 rolling inside of the rectangular section of pole 304 guide the blade while minimizing hardware complexity and weight needed in providing the blade guide function.

As illustrated in FIG. 19B a section of the pole has been cut away near pneumatic control switch 320 because the typical light weight pneumatically actuated pole saw will be five to eight meters in length. This length does not lend itself to detailed viewing of internal parts without visual removal of a section of the pole thus shortening its appearance in FIG. 19B. As illustrated in the attached FIGS. and by moving weight away from the blade end of the pole and towards the operator the pole saw is balanced to provide control and positioning of the pole saw as it is extended to cut a tree as illustrated in FIG. 16A by effectively extending piston rod 202 through use of light weight rod extension 303. This rod extension 303 results in the weight of the piston cylinder and associated valves being shifted down the pole toward the operator, making it easier for the operator to balance and align and position the pneumatic pole saw for cutting. The necessary extended connection between the piston rod and the blade can be achieved by other than a rod (e.g., cable and pulley or any other equivalent means). Yet another means would be the use of a single ended piston with a spring return on the blade and a spring return on the piston then only a cable would be required to transfer power between the piston and the blade, wherein the blade return spring would provide power for the push stroke of the blade.

In one non-limiting exemplary embodiment, a compressed gas switching pneumatic valve assembly is provided. The valve assembly comprising an outer pneumatic chamber, a slidably received gas sealed valve member within the pneumatic chamber, an internal void extending from one side of the pneumatic chamber to another side of the pneumatic chamber, the void allowing axial location of the pneumatic valve assembly around an axial located piston rod of a pneumatic piston chamber, the pneumatic valve assembly further comprising two or more gas conductive ports and conduits to conduct switchable gas fluid flow into and out of the pneumatic chamber when slidably received valve member is externally actuated to change position within the pneumatic chamber.

In another non-limiting embodiment, the pneumatic valve assembly is configured as a pilot valve, the pneumatic valve chamber being axially located and attachable on one end to a piston chamber, the internal pneumatically sealed slidable spring returned valve member is actuated to alternate gas flow position by end effector on axial piston rod such that motion of the slidable valve member switches compressed gas fluid flow through fluid conducting port and conduit from inward gas fluid flow to outward gas fluid flow and removal of piston rod mounted end effector from actuation of valve member allows spring return of the valve member whereby gas flow is switched from outward fluid flow to inward fluid flow direction.

Still further and in yet another embodiment, the valve assembly is configured as a main valve, the pneumatic valve chamber being axially located around the piston rod of a pneumatic piston chamber and which switches compressed gas flow to and from a piston chamber, the pneumatic valve being configured as a main pneumatic valve assembly with slidably received pneumatically sealed valve member being externally actuated by compressed gas to change positions by compressed gas fluid pressure on one sealed chamber end of the valve member, compressed gas fluid flow being directed to switch gas flows to alternate position of the valve member through fluid conducting ports and conduits from inward flowing to outward flowing and when gas fluid pressure is removed from one sealed chamber end of the valve member and gas fluid pressure is applied to an opposite sealed chamber end of the valve member compressed gas fluid flow is directed to switch gas flows by alternating position of the valve member through fluid conducting port and conduit from outward flowing to inward flowing.

In still yet another embodiment, the compressed gas switching pneumatic valve assembly is comprised of both a pilot valve and a main valve gas fluid flow through the conduit from the fluid outlet of the pilot valve is used to actuate the compressed gas actuated main valve.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pneumatically powered pole saw comprising:
    a pole;
    a cutting blade movably mounted to the pole;
    a piston slidably received within a piston chamber of the pole;
    a piston rod coupling to the cutting blade to the piston;
    gas actuated main valves configured for movement between first positions and second positions wherein the gas actuated main valves are located in a main valves assembly fluidly coupled to the piston chamber;
    a first pilot valve configured to send actuating gas through a conduit to the main valves assembly, the actuating gas of the first pilot valve actuating the gas actuated valves of the main valves assembly to the first position, wherein movement of the main valves to the first position releases a portion of a source of gas into the piston chamber on one side of the piston while venting the opposite side of the piston chamber, and when the main valves assembly is in the first position the cutting blade to moves in a first cutting direction towards a limit of travel in the first cutting direction; and
    a second pilot valve configured to send actuating gas through a conduit to the main valves assembly when the limit of travel in the first cutting direction has been reached, the actuating gas of the second pilot valve causes the main valves to be moved to the second position, wherein movement of the main valves to the second position releases another portion of compressed gas into the piston chamber on the opposite side of the piston chamber and venting the one side of the piston chamber, wherein the cutting blade moves in an opposite second cutting direction with respect to the first cutting direction until a limit of travel in the second cutting direction is reached wherein the first pilot valve is again actuated and the cutting blade moves again in the first cutting direction until the limit of travel in the first cutting direction is reached.

2. The pneumatically powered pole saw of claim 1, wherein the piston rod is connected to the cutting blade via a connecting rod.

3. The pneumatically powered pole saw of claim 1, wherein a pair of springs are located on the piston rod to impart opposite forces on the first pilot valve and the second pilot valve as the cutting blade moves between the limit of travel in the first and second cutting directions.

4. The pneumatic pole saw of claim 1, wherein main valves assembly is located within the pole and the main valves assembly is axially located around the piston rod and wherein the piston rod is slidably received within the main valves assembly.

5. The pneumatic pole saw of claim 1, wherein cutting blade teeth of the cutting blade are predominantly angled towards the first cutting direction.

6. The pneumatic pole saw of claim 1, wherein rotatable bearings are located between a support and a guide blade of the pole saw, the guide blade being secured to the cutting blade and the piston rod and the support being secured to the pole.

7. The pneumatic pole saw of claim 1, wherein a thickness of the cutting blade from cutting teeth to a top of blade, is variable.

8. The pneumatic pole saw of claim 1, further comprising a limb stop mounted to the pole.

9. The pneumatic pole saw of claim 1 wherein a roller is mounted at an end of the pole to support and guide the cutting blade.

10. The pneumatic pole saw of claim 1 wherein a manually operated pilot valve is located on the pole to enable an operator control of the source of gas into the main valves assembly.

11. A pneumatically powered pole saw, comprising:
    an extendable pole;
    a cutting blade movably mounted to the extendable pole;
    a piston linked to the cutting blade, the piston being slidably received within a piston chamber of the pneumatically powered pole saw;
    a reciprocating valve operably coupled to the pneumatically powered pole saw, the reciprocating valve being configured for movement between a first position and a second position wherein the reciprocating valve releases a portion of a source of compressed gas into the piston chamber on one side of the piston when the reciprocating valve is in the first position causing the cutting blade to move in a first cutting direction towards a limit of travel in the first cutting direction and a first check valve provides fluid communication to the piston chamber on another side of the piston causing the reciprocating valve to move from the first position towards the second position, when the cutting blade reaches the limit of travel in the first direction, the reciprocating valve releases another portion of the source of compressed gas into the piston chamber on the another side of the piston when the reciprocating valve is in the second position causing the cutting blade to move in a second cutting direction opposite to the first cutting direction and towards a limit of travel in the second cutting direction and a second check valve provides fluid communication to the piston chamber on the one side of the piston, the reciprocating valve moving from the second position towards the first position when the cutting blade reaches a limit of travel in the second direction.

12. A pneumatic valve assembly, comprising:
a piston slidably received within a piston chamber;
a piston rod coupled to the piston;
gas actuated main valves configured for movement between first positions and second positions wherein the gas actuated main valves are located in a main valves assembly fluidly coupled to the piston chamber;
a first pilot valve configured to send actuating gas through a conduit to the main valves assembly, the actuating gas of the first pilot valve actuating the gas actuated valves of the main valves assembly to the first position, wherein movement of the main valves to the first position releases a portion of a source of gas into the piston chamber on one side of the piston while venting the opposite side of the piston chamber, and when the main valves assembly is in the first position the piston rod moves in a first direction towards a limit of travel in the first direction;
a second pilot valve configured to send actuating gas through a conduit to the main valves assembly when the limit of travel in the first direction has been reached, the actuating gas of the second pilot valve causes the main valves to be moved to the second position, wherein movement of the main valves to the second position releases another portion of compressed gas into the piston chamber on the opposite side of the piston chamber and venting the one side of the piston chamber, wherein the piston rod moves in an opposite second direction with respect to the first direction until a limit of travel in the second direction is reached wherein the first pilot valve is again actuated and the piston rod moves again in the first direction until the limit of travel in the first direction is reached; and
wherein the first pilot valve and the second pilot valve are each configured to be actuated via movement of the piston rod.

13. The pneumatic valve assembly as in claim 12, wherein the main valves assembly, the first pilot valve and the second pilot valve are each configured to be slidably received within a housing secured to the piston chamber.

14. The pneumatic valve assembly as in claim 12, wherein the piston rod extends from either end of the piston chamber and the main valves assembly comprises a first main valve and a second main valve.

15. The pneumatic valve assembly as in claim 13, wherein the piston chamber and the housing are axially aligned in a cylindrical item.

16. The pneumatic valve assembly as in claim 15, wherein the cylindrical item is a pole of a pole saw.

17. A method for pneumatically powering a pole saw, comprising:
slidably mounting a piston in a piston chamber for movement between a first position and a second position; and
moving a reciprocating valve fluidly coupled to the piston chamber, wherein the reciprocating valve is configured for movement between a first position and a second position wherein the reciprocating valve releases a portion of a source of compressed gas into the piston chamber on one side of the piston when the reciprocating valve is in the first position causing the piston to move in a first direction towards a limit of travel in the first direction and a first check valve provides fluid communication to the piston chamber on another side of the piston causing the reciprocating valve to move from the first position towards the second position, when the piston reaches the limit of travel in the first direction, the reciprocating valve releases another portion of the source of compressed gas into the piston chamber on the another side of the piston when the reciprocating valve is in the second position causing the piston to move in a second direction opposite to the first cutting direction and towards a limit of travel in the second direction and a second check valve provides fluid communication to the piston chamber on the one side of the piston, the reciprocating valve moving from the second position towards the first position when the piston reaches a limit of travel in the second direction, wherein movement of the piston between the limits of travel in the first and second directions causes the reciprocating valve to move between the first position and the second position.

18. A compressed gas switching pneumatic valve assembly, comprising:
an outer pneumatic chamber; and
a slidably received gas sealed valve member within the outer pneumatic chamber, wherein an internal void extends from one side of the outer pneumatic chamber to another side of the outer pneumatic chamber, the internal void being configured to allow axial location of an pneumatic valve assembly around an axially located piston rod of a pneumatic piston chamber, the pneumatic valve assembly further comprising at least fluid paths to provide switchable fluid flow into and out of the outer pneumatic chamber when the slidably received valve member is externally actuated to change a position within the outer pneumatic chamber.

19. The pneumatically powered pole saw of claim 1, wherein movement of the piston in the first direction stores potential energy in a spring attached to the cutting blade and the pole, wherein the potential energy when released forces the cutting blade in the second direction and wherein the potential energy is release when the piston changes direction from the first direction to the second direction.

20. The pneumatically powered pole saw of claim 19, wherein a cable provides connection between the cutting blade and the piston rod.

* * * * *